(12) United States Patent
Bricaud et al.

(10) Patent No.: US 6,447,338 B1
(45) Date of Patent: Sep. 10, 2002

(54) ONE-PIECE SMART CARD CONNECTOR

(75) Inventors: Herve' Guy Bricaud, Dole (FR); Yves Pizard, Dole (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/741,640

(22) Filed: Dec. 19, 2000

Related U.S. Application Data

(63) Continuation-in-part of application No. PCT/FR00/03906, filed on May 2, 2000.

(30) Foreign Application Priority Data

May 7, 1999 (FR) .......................................... 99 05857

(51) Int. Cl.⁷ ............................................... H01R 23/70
(52) U.S. Cl. ...................................... 439/630; 439/862
(58) Field of Search ................................ 439/66, 630 I, 439/862

(56) References Cited

U.S. PATENT DOCUMENTS

| | | | | |
|---|---|---|---|---|
| 5,586,890 A | * | 12/1996 | Braun | .......................... 439/66 |
| 5,746,607 A | * | 5/1998 | Bricaud et al. | ............... 439/66 |
| 5,775,949 A | | 7/1998 | Bricaud et al. | |
| 5,800,200 A | * | 9/1998 | Brioaud et al. | ............. 439/404 |
| 5,980,323 A | * | 11/1999 | Bricaud et al. | ............. 439/630 |
| 6,086,424 A | * | 7/2000 | Chang | ......................... 439/630 |
| 6,305,948 B1 | * | 10/2001 | Wu | ............................. 439/66 |
| 6,315,620 B1 | * | 11/2001 | Moir et al. | ................. 439/862 |
| 6,326,568 B2 | * | 12/2001 | Martucci et al. | ........... 200/283 |

FOREIGN PATENT DOCUMENTS

| | | |
|---|---|---|
| EP | 0 845 837 A2 | 6/1998 |
| FR | 2 737 321 A1 | 1/1997 |
| FR | 2 742 561 A1 | 6/1997 |

* cited by examiner

*Primary Examiner*—Tulsidas Patel
*Assistant Examiner*—Thanh-Tam Le
(74) *Attorney, Agent, or Firm*—Roger C. Turner

(57) ABSTRACT

A smart card connector for engaging contact pads of a smart card. The connector (10) includes a molded body (12) with cavities (24) having open rear ends (29) so contacts (14) can be inserted forwardly (F) therein. Each contact has an upper branch (42) with a rear free end forming a nose (32), and the body has a top crosspiece (66) at the open rear end of the cavity that lies against the nose. The cavity has a horizontal groove (52, 54) at its bottom. A lower branch of the contact has a foot (48, 50) that is inserted forwardly into the groove. During contact insertion, the upper branch is downwardly deflected sufficiently to pass under the top crosspiece while the foot is slid horizontally into the groove.

9 Claims, 46 Drawing Sheets

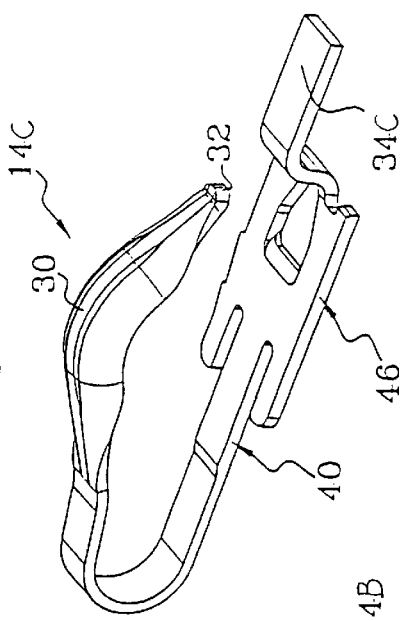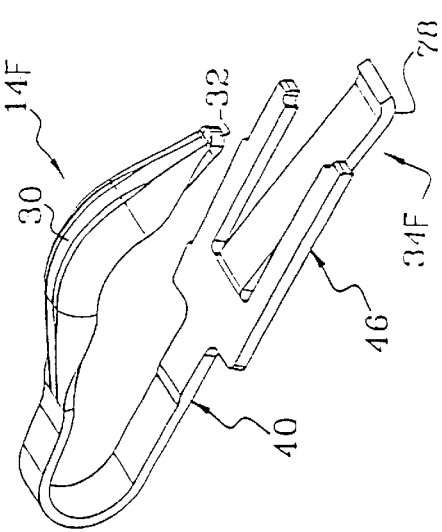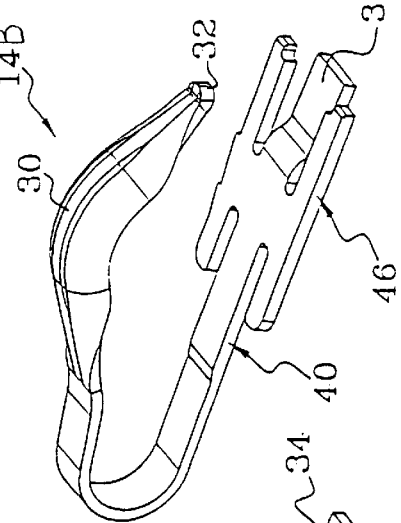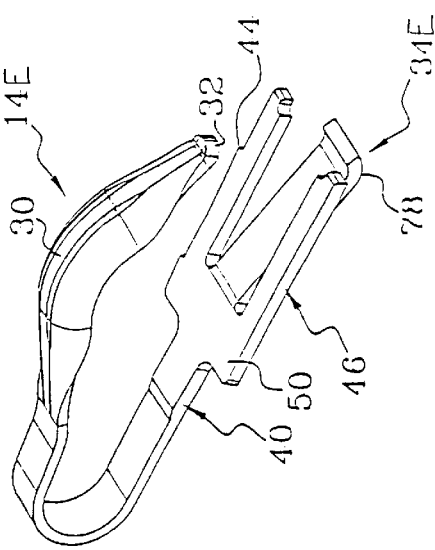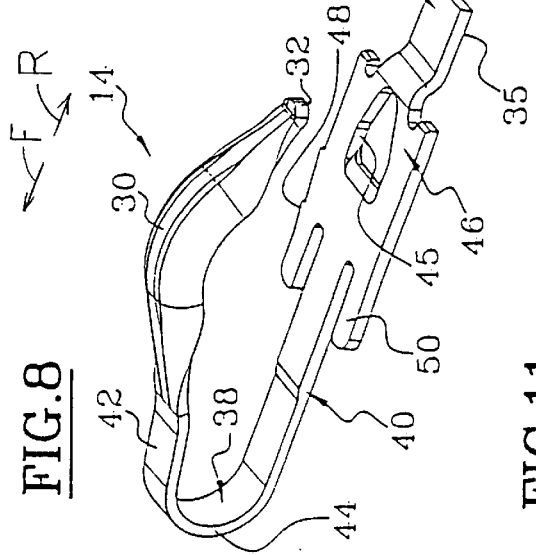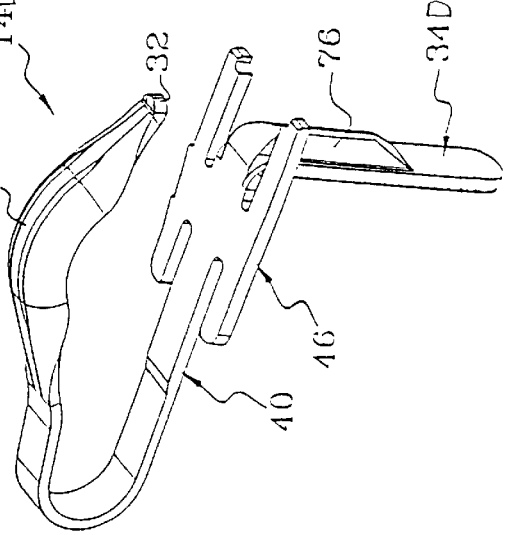

ONE-PIECE SMART CARD CONNECTOR

CROSS REFERENCE

This is a continuation-in-part of PCT application PCT/FR00/03906 filed May 2, 2000, which claims priority from French application Ser. No. 99/05857 filed May 7, 1999.

BACKGROUND OF THE INVENTION

Smart cards, which are of about the same thickness as a credit card and of about the same or smaller width and length, have contact pads on one surface. A smart card reader may include a connector that is mounted on a circuit board and which is used with a smart card guide. The smart cards is guided so its pads engage contacts of the connector. One way to construct a smart card connector is to mold the insulative body of the connector around the contacts. This results in a more complicated molding process, prevents a customer who buys the molded body from inserting his own contacts, and prevents replacement of a damaged contact. Another way is to mold separate top and bottom body halves, place the contacts in one of the body halves, and bond the body halves together. This has the same disadvantages as the earlier mentioned process. A smart card connector which enabled the body to be simply molded in a single piece, which enable the buyer of the body to install his own contacts, and which enabled replacement of a damaged contact, would be of value.

SUMMARY OF THE INVENTION

In accordance with one embodiment of the present invention, a smart card connector is provided with an insulated body that can be molded in a single piece, with contacts that can be initially installed by a purchaser of the molded body, and which can constructed to enable replacement of a damaged contact. The body has a plurality of contact-holding cavities with open rear ends through which a contact can be inserted. A top crosspiece lies at the top of the open rear end of the cavity. Each contact has upper and lower branches and a linking branch that extends in a largely 180° loop and that connects front ends of the upper and lower branches. Each contact can be inserted forwardly through the open rear end of a cavity to the final position of the contact. During insertion, the contacting part of the upper branch is downwardly deflected to pass under the top crosspiece that lies over the rear of the cavity.

Each cavity form has a side that forms a groove with a rearwardly-opening groove end. The lower branch of each contact has a foot that lies primarily in a horizontal plane and that slides horizontally into the groove as the contact is inserted. The contacting part of the upper branch is downwardly deflectable sufficiently that the foot can be slid horizontally into its groove as the contacting part moves under the top crosspiece. The construction allows the use of a one-piece body that is molded separately from the contacts and allows the purchaser of the body to install his own contacts. The body can be constructed so a damaged contact can be replaced, and so it can be replaced while the connector is mounted on a circuit board and all other contacts are soldered to traces on the circuit board.

The novel features of the invention are set forth with particularity in the appended claims. The invention will be best understood from the following description when read in conjunction with the accompanying drawings.

BRIEF DESCRIPTION OF THE DRAWINGS

FIG. 1A is an exploded partial isometric view of the connector of FIG. 1 shown mounted on a circuit board, and including a guide for guiding a smart card and also including a smart card.

FIG. 8 is an isometric view of one of the contacts of the connector of FIG. 1.

FIGS. 9–13 are isometric views of five alternate embodiments of contacts which can be used in connector bodies, with the contacts of the figures differing from each other primarily by the design of their termination ends.

DESCRIPTION OF THE PREFERRED EMBODIMENTS

Figure 1:
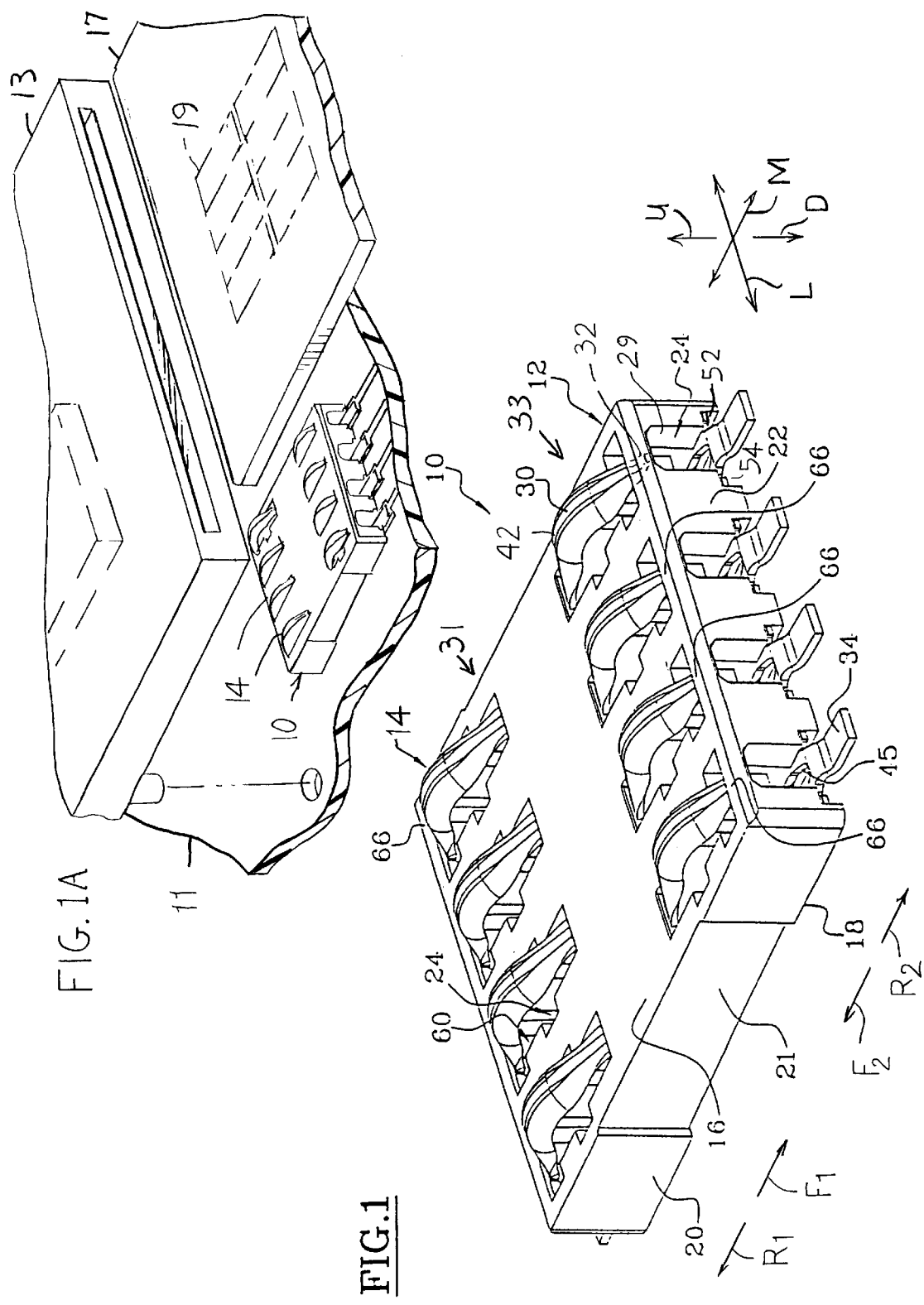
FIG. 1 is an isometric top view of an electrical connector of a first embodiment of the invention.

FIG. 1 illustrates an electrical connector 10 which includes a molded body 12 of insulating material and a plurality of electrical contacts 14 mounted in the body. As shown in FIG. 1A, the connector is designed to be mounted on a circuit board 11 and is used with a casing or guide 13 that has a slot 15 or only slot sides. The casing guides a smart card 17 through the slot and into engagement with the contacts 14 of the connector. The smart card has upper and lower faces with contact pads 19 shown formed on the lower face of the card. The contacts 14 engage all or selected ones of the contact pads.

Figure 2:
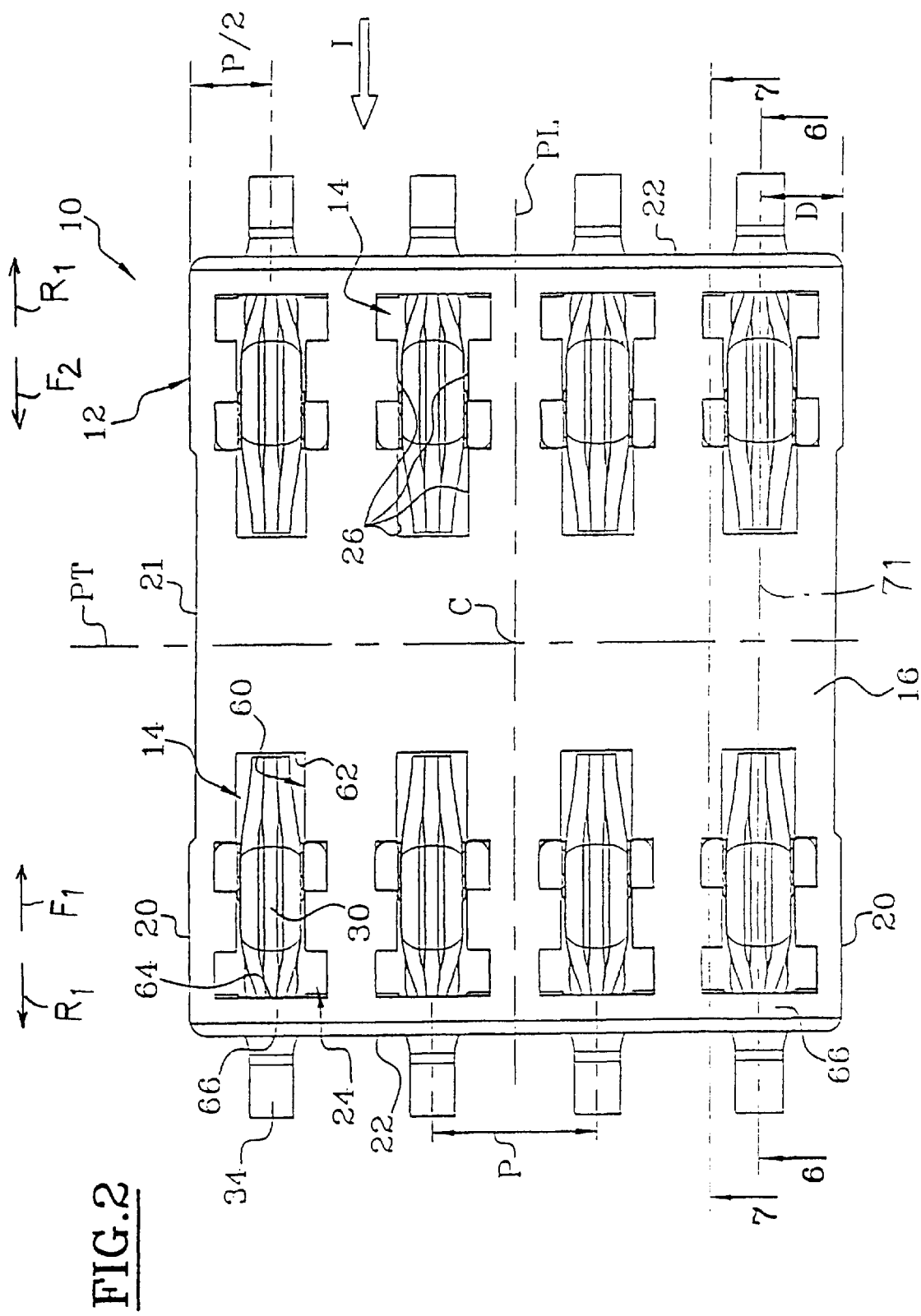
FIG. 2 is a top view of the connector of FIG. 1.
Figure 3:
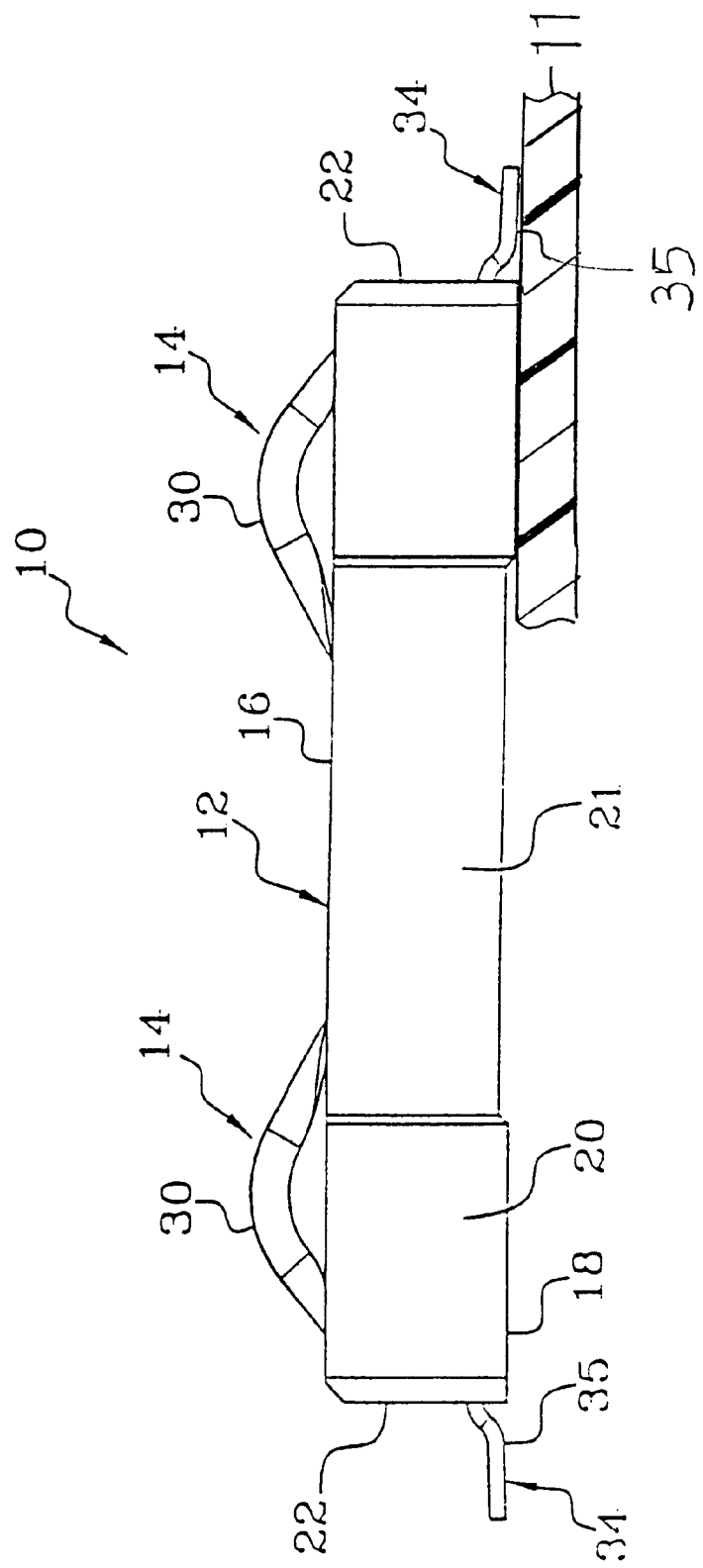
FIG. 3 is a side elevation view of the connector of FIG. 2.
Figure 4:
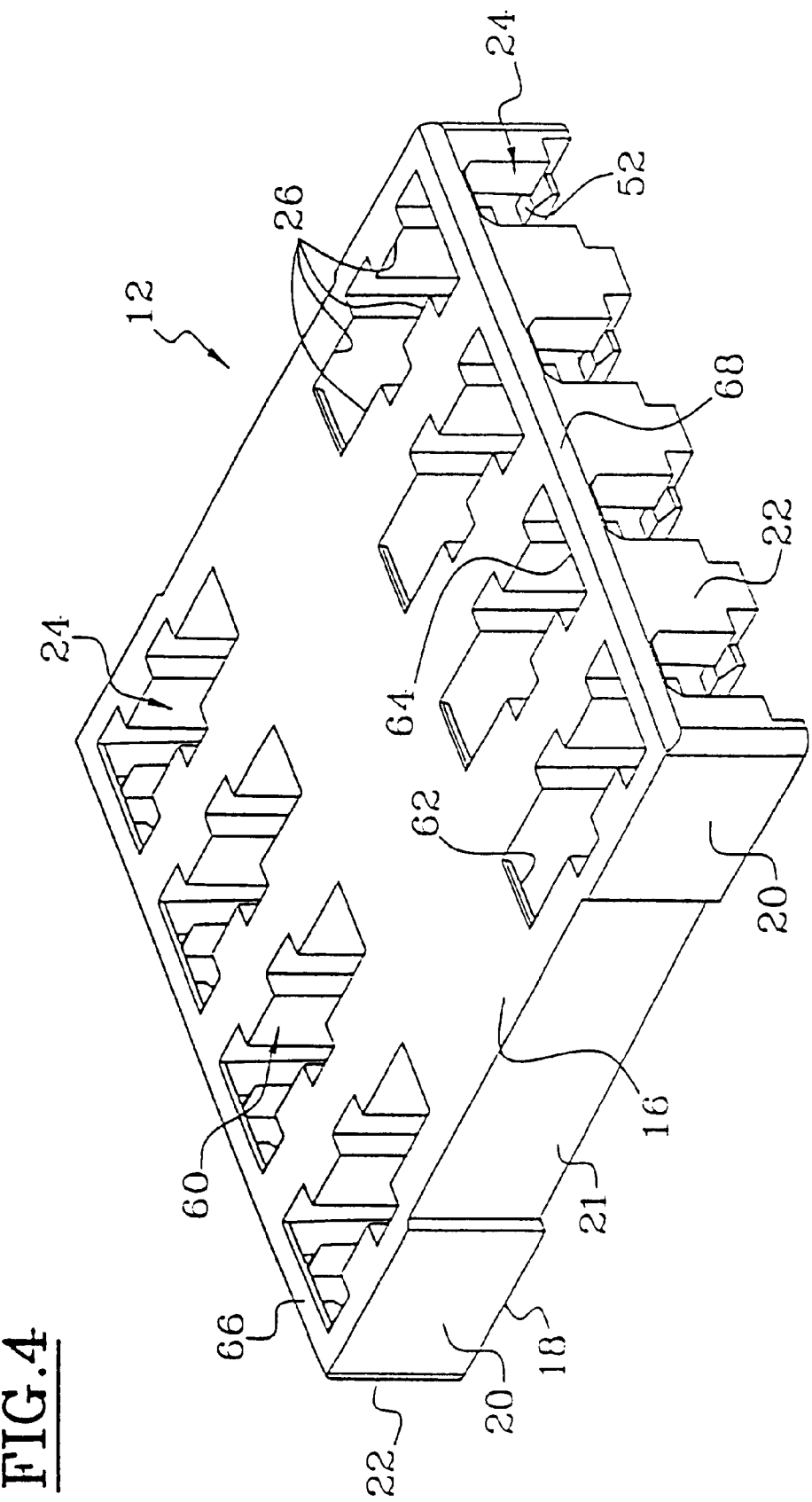
FIG. 4 is an isometric top view of the insulating body of the connector of FIG. 1.

As shown in FIG. 1, the body 12 is of largely parallelepiped shape with upper and lower body faces 16, 18 spaced in upward U and downward D directions, laterally opposite sides 20 spaced in lateral directions L, and longitudinally opposite body ends 22 spaced in longitudinal directions M. The connector is symmetric about a plane PT that is halfway between the longitudinally opposite ends 22. Forward and rearward longitudinal directions F1, R1 are designated for the first part 31 of the connector, and forward and rearward longitudinal directions F2, R2 are designated for the second part 33. As shown in FIG. 2, the connector is also symmetric about a plane PL, with the planes PT and PL intersecting at point C which constitutes the center of the connector.

FIG. 1 shows that the connector has four pairs of contacts 14, with the contacts of each pair being spaced in the longitudinal direction M. The body 12 has eight cavities 24 arranged in four pairs to hold the four pairs of contacts. Each cavity 24 extends forwardly into a corresponding rear face 22 of the body. Each cavity opens vertically downward to the lower face 18 of the body, and opens upward to the upper face 16 of the body.

Figure 5:
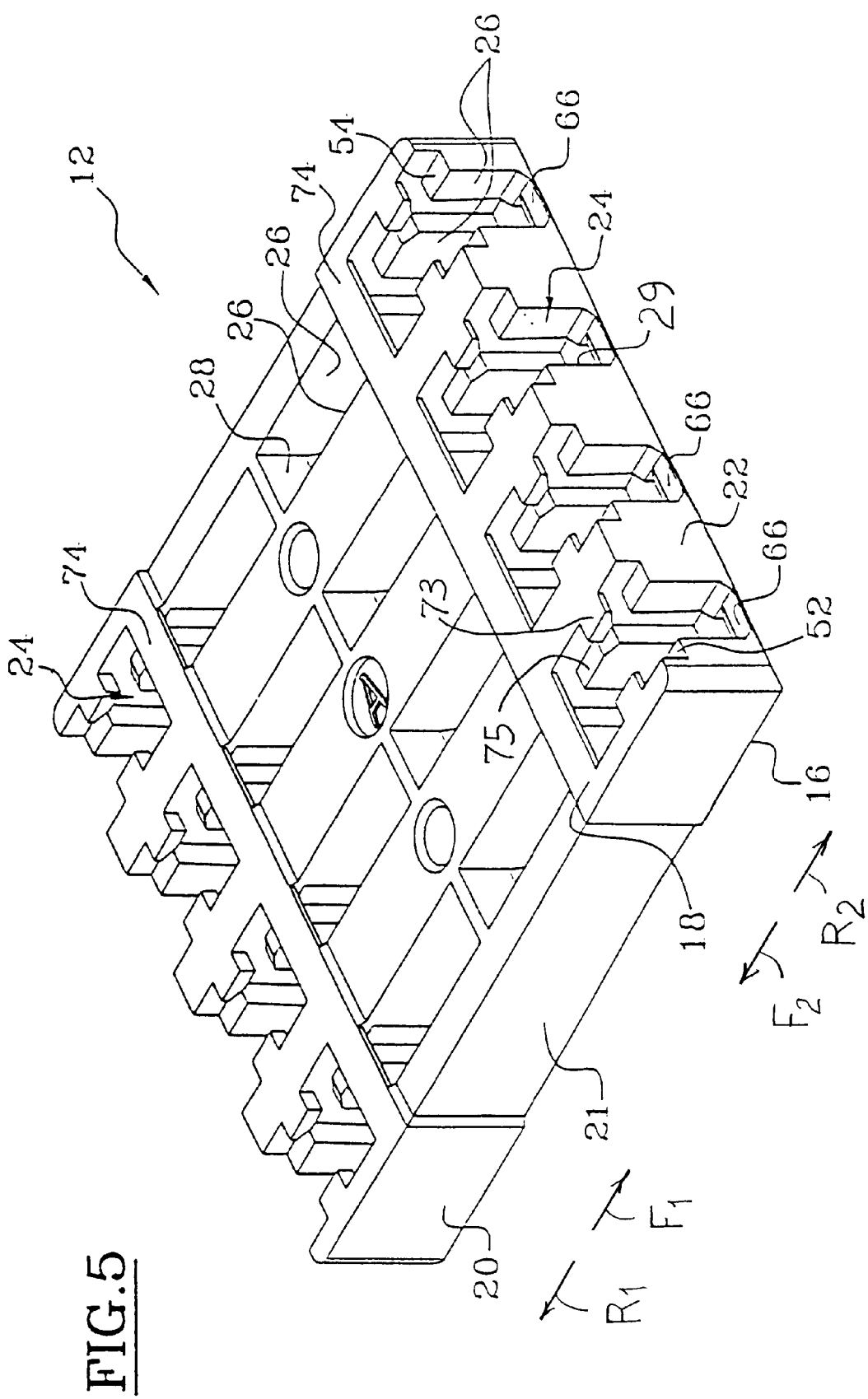
FIG. 5 is an isometric bottom view of the body of FIG. 4.

As shown in the upside-down view of FIG. 5, each cavity 24 has laterally opposite parallel faces 26 that each lies in a vertical plane. A partition 28 forms a front end of each cavity. Each cavity has a rear end 29 that lies at a rear end 22 of the body and is open in a rearward direction. The rear end 29 of each cavity extends vertically along a majority of the height of the body, and in fact, extends along the entire height except for a top crosspiece 66.

Figure 6:
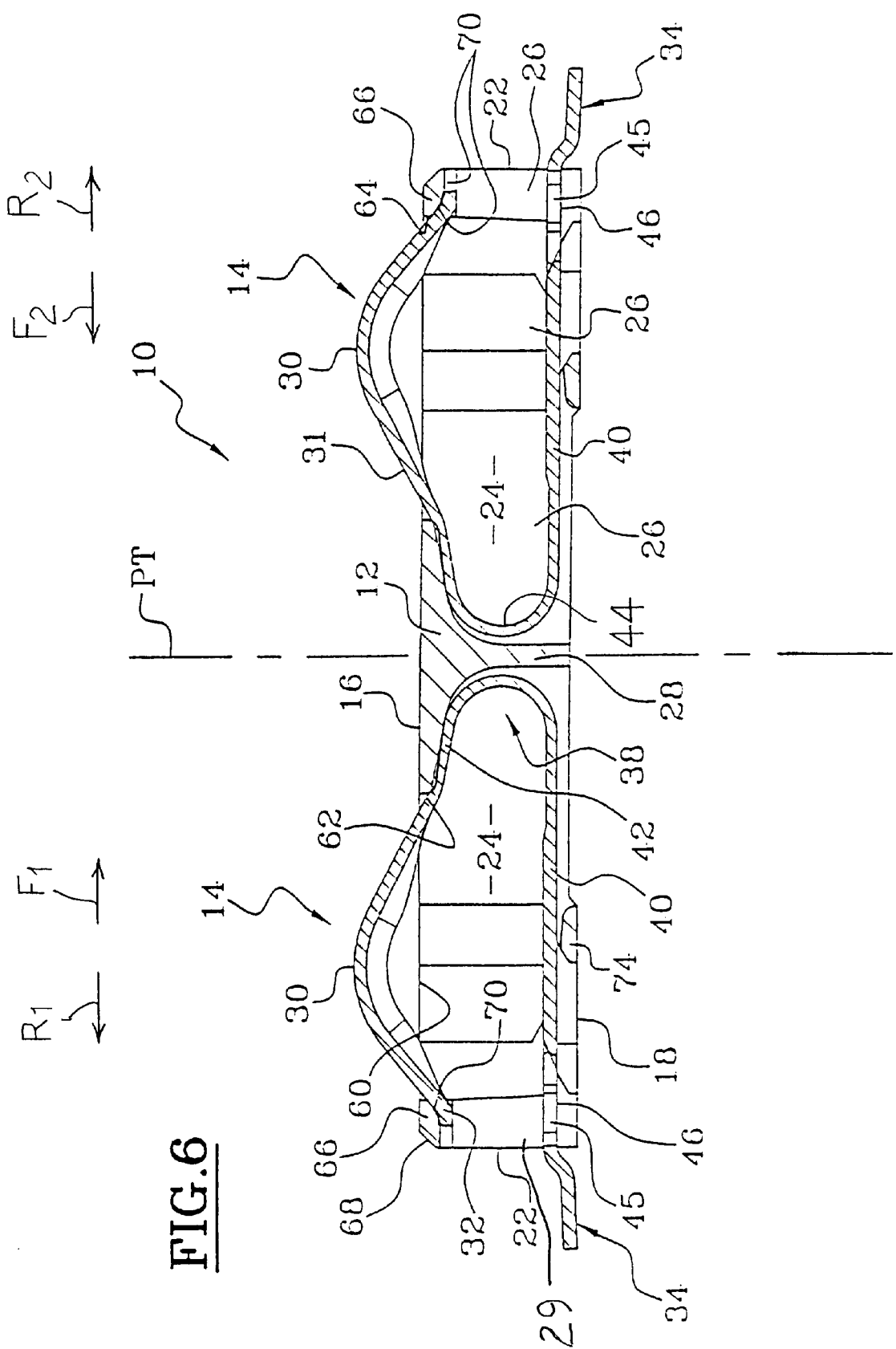
FIG. 6 is a sectional view taken on line 6—6 of FIG. 2.
Figure 7:
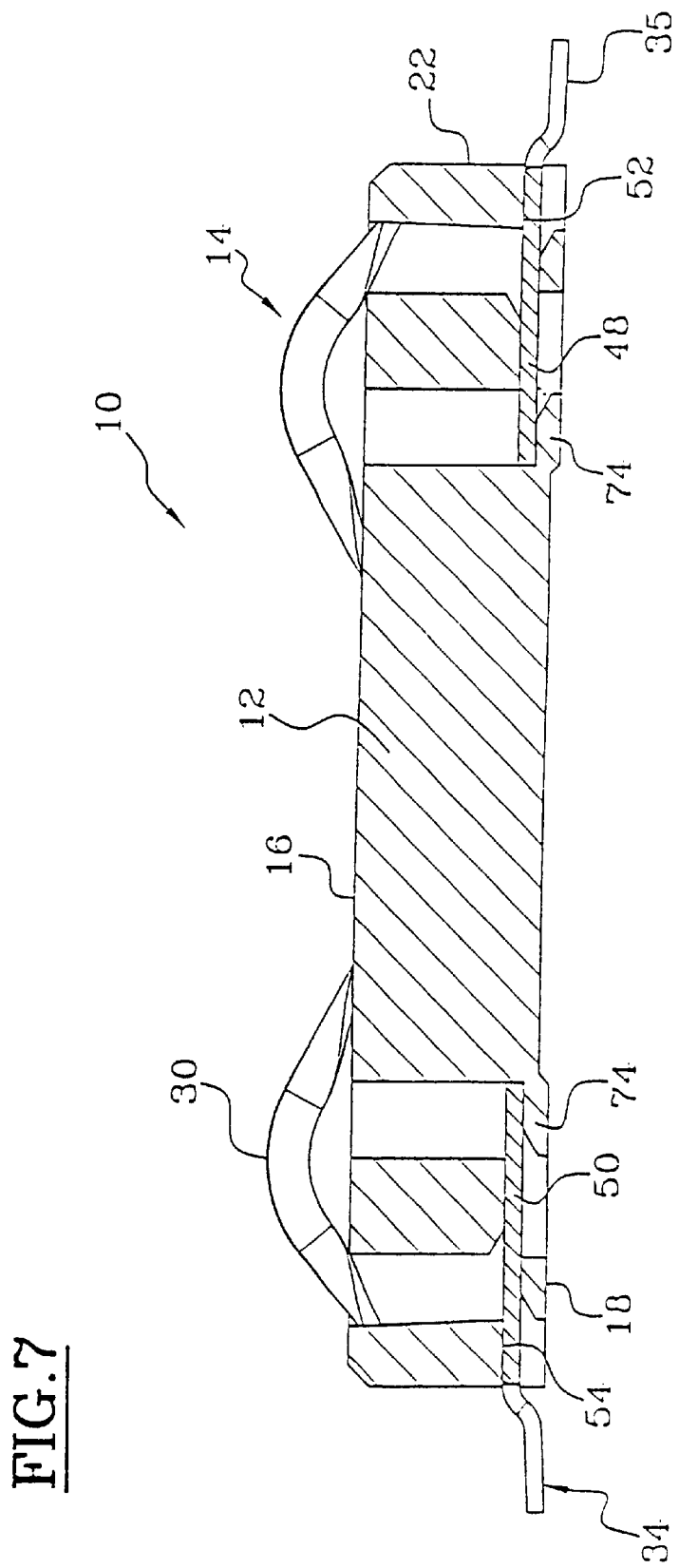
FIG. 7 is a sectional view taken on line 7—7 of FIG. 2.

As shown in FIG. 6, each contact 14 is formed of sheet metal that has been cut and bent. Each contact has lower and upper branches 40, 42, with front ends of the branches joined by a central linking branch 38 that extends in an approximately 180° loop. The upper branch includes a contacting part 30 that projects above the upper face 16 of the body and that has a convex upper surface to engage a contact pad of a smart card. The rear end of the upper branch forms a nose 32 that is biased upwardly against the top piece 66. A lower branch 40 has a rear that forms a termination end 34 in the form of a termination tab. Each termination tab can be soldered to a conducting trace on a circuit board.

FIG. 8 shows that contact 14, has a central bend 44 at the central linking part 38, which forms an acute angle between the lower and upper branches 40, 42 of the contact. When the contacting part 30 is depressed, most of the bending occurs at the central bend 44, which provides high resilience while enabling the connector to occupy only a small area on the top face of the circuit board.

FIG. 2 shows that the lateral distance D separating a side face 20 of the insulative body from the vertical mid plane 71 of a pair contacts, is equal to one half the pitch P, which is the distance between the mid planes of two adjacent blades. In other words, D equals P/2. This allows two connectors, each with at least one pair of contacts, to be used together by mounting their lateral ends 20 facewise against or adjacent to each other. The lateral distance between the contacts of the two connectors will then be equal to the distance P which equals the center-to-center distance of contact pads of the smart card. If two connectors 10 of the construction shown in FIG. 2 are placed side-by-side, then the combination provides twelve contacts. If smart card readers are to be produced with differing numbers of contact pads to be engaged, this can be accomplished by manufacturing a single size connector and placing two or more connectors side-by-side. It is noted that the lateral sides 20 of the body each has a central recess 21. Connection gates, through which molding material is injected can be located at the recess 21, so that any irregularities lie in the recess and do not affect the flat faces at 20.

FIG. 8 shows that the lower branch 40 of each contact has a wide rear portion 46 which lies approximately below the nose 32 and which has a greater width than the average width of the contact. The rear portion 46 has a hole 45, and the nose 32 can move down into the hole 45 when the upper branch is bent down during installation of the contact in a cavity. It is noted that the termination tab 34 extends rearwardly from the widened part.

The widen rear portion 46 of the contact has opposite lateral projections, including a harpoon 48 and a stabilizing tab 50 that each forms a foot, with each foot having a free front end. As shown in FIG. 5, each cavity forms a pair of grooves 52, 54 at laterally opposite sides of the bottom of the cavity. The two foots at laterally opposite sides of the lower branch, can each be slid forwardly into a corresponding one of the grooves. Each groove is formed by a pair of housing tabs including tabs 73 with upper surfaces and including tabs 75 with downwardly-facing surfaces formed by vertical columns at each side of the cavity. The tabs 73 do not lie directly under the tabs 75 for ease in molding. It is noted that this construction of grooves that receive foots on contacts is known in the prior art.

In order to install the contact in a cavity, the foots 48, 50 (FIG. 8) must each extend in a substantially horizontal plane and slide horizontally into a corresponding groove 52, 54. At the same time, the upper branch is deflected downwardly so the nose 32 moves down into the hole 45, to allow the contacting part 30 to pass under the top crosspiece 66 (FIG. 6) at the rear end of each cavity. Once the contacts are installed, teeth on the harpoon 48 (FIG. 8) resist pullout of the contacts from the cavity, although it is possible to remove a contact. When the termination tabs 34 have been soldered to traces on a circuit board, the contacts cannot be removed unless a termination tab is desoldered. Then, the contact is twisted and shifted as it is carefully pulled out. Applicant's construction permits the body to be molded in a single piece without the contacts, and allows the contacts to thereafter to be installed either by the original manufacturer or by the customer.

FIG. 5 shows that the body has a continuous bottom crosspiece 74 that extends across the bottom of the cavities, at about the middle of the longitudinal length of the cavities. The bottom crosspiece strengthens the cavities and also provides another wall for the slots. It is noted that in FIG. 2 the tops of cavities leave the center of the upper face 16 free, providing a large flat face area around the center C where the body can be picked up by suction in the "pick and place" technique. It is noted in FIG. 6 that the top crosspiece 66 has a chamfer 68 and forms the rear end of the upper face 16 and the top of the end 22 of the body. The top crosspiece has an inclined lower face 70 against which the nose 32 of the contact bears. Each nose 32 is protected by a top crosspiece 66 against any accidental or intentional lifting up of the upper branch of the contact by inserting an object underneath the nose.

When a contact is inserted, only the insertion tab 34 may be held and pushed forward. After the central linking branch 38 has passed forwardly into the cavity, the inclined upper face 31 of the upper branch contacts the top crosspiece 66 and is depressed until the contacting part 30 passes the top crosspiece and can move up above the upper face 16 of the body. The contact is compressed only elastically during insertion. It is noted that the cavity has a minimum longitudinal length, because the nose 32 lies only slightly forward of the rear end at 22 of the body.

The connector allows contacts of high resilience to be used, by the presence of an approximately 180° loop to connect upper and lower branches. The longitudinal length of the cavities is a minimum because the noses 32 lie very close to an end 22 of the body.

Figure 14:
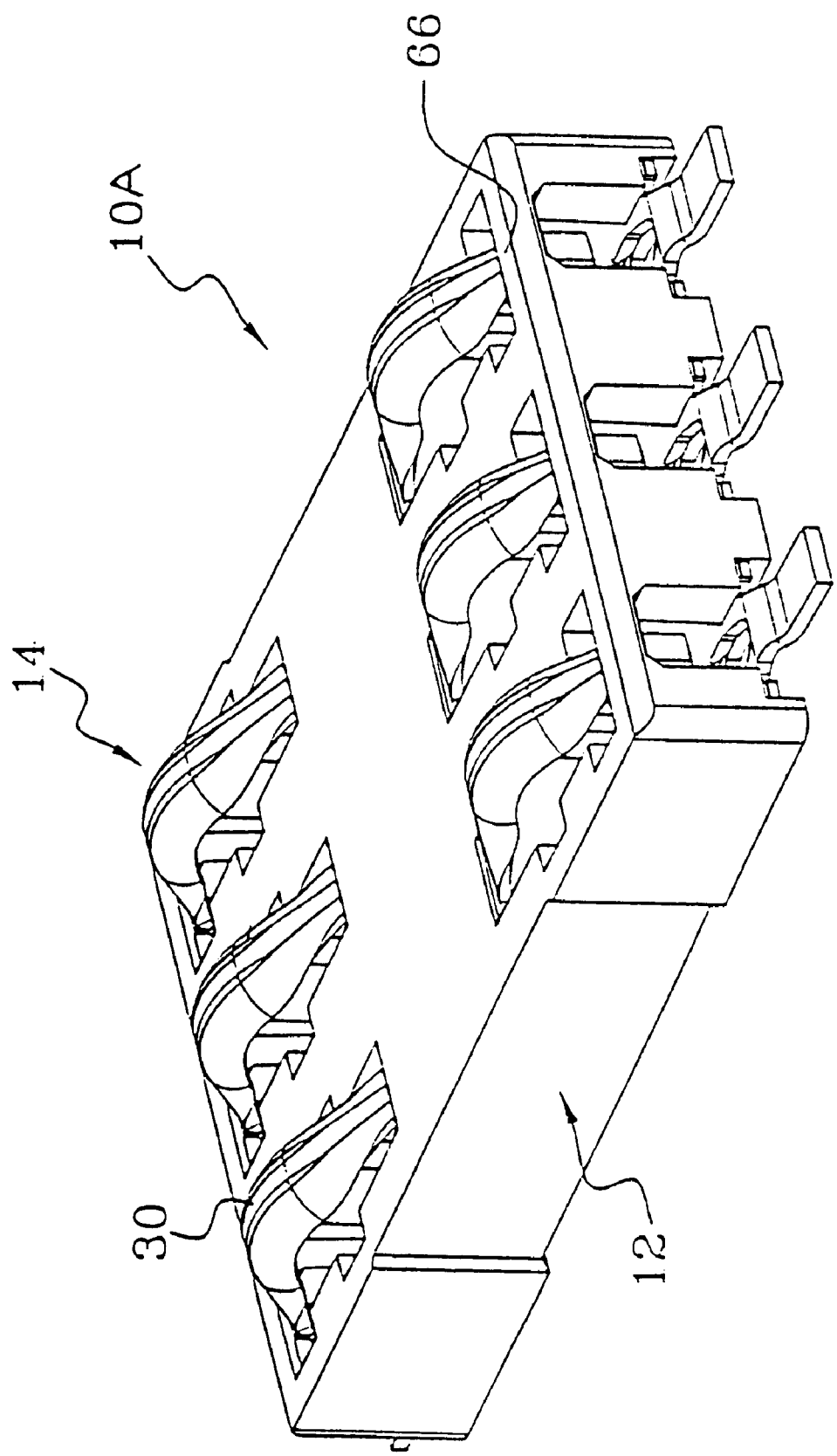
FIG. 14 is a top isometric view of a connector that is similar to that of FIG. 1 but which has only three pairs of contacts.

In some cases, only three pairs of contacts are required, this being shown in FIG. 14 where the connector 10A holds only six contacts 14, arranged in three pairs. Otherwise, the connector of FIG. 14 is identical to the connector of FIGS. 1–8.

Figure 15:
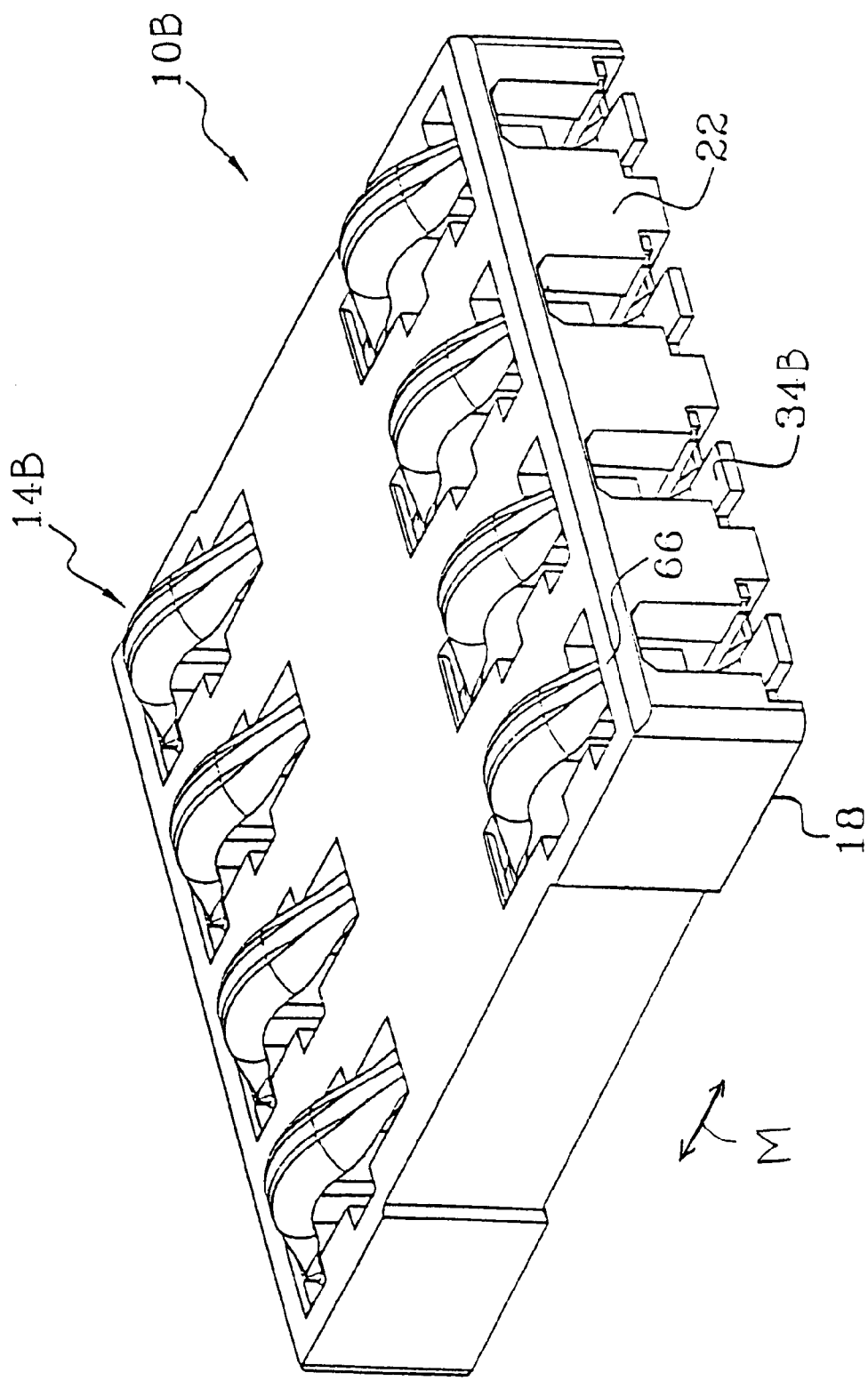
FIG. 15 is top isometric view of a connector with contacts of the type illustrated in FIG. 9.

In the connector 10B of FIG. 15, the termination ends or tabs 34B of the contacts 14B are shorter and do not project longitudinally M beyond the cavities. The tabs are visible and can be soldered by an infrared solder reflow beam. FIG. 9 shows one of the contacts 14B. The tab 34B is downwardly depressed from the rear portion 46B so the nose 32 can be downwardly deflected against the tab 34B. It would be possible to provide a hole in the tab 34B to further depress the nose 32, and such a hole could improve soldering of the tab to a circuit board because of penetration of the solder into such hole.

FIG. 10 illustrates a contact 14C which is similar to that of FIG. 8 except that it has a termination tab 34C that is offset vertically upward with respect to the rest of the lower branch 40 instead of being offset downwardly. In one example, the connector body may lie in a hole in a circuit board, and the termination tab 34C can extend upwardly through the hole to engage a trace on the upper face of the circuit board.

Figure 16:
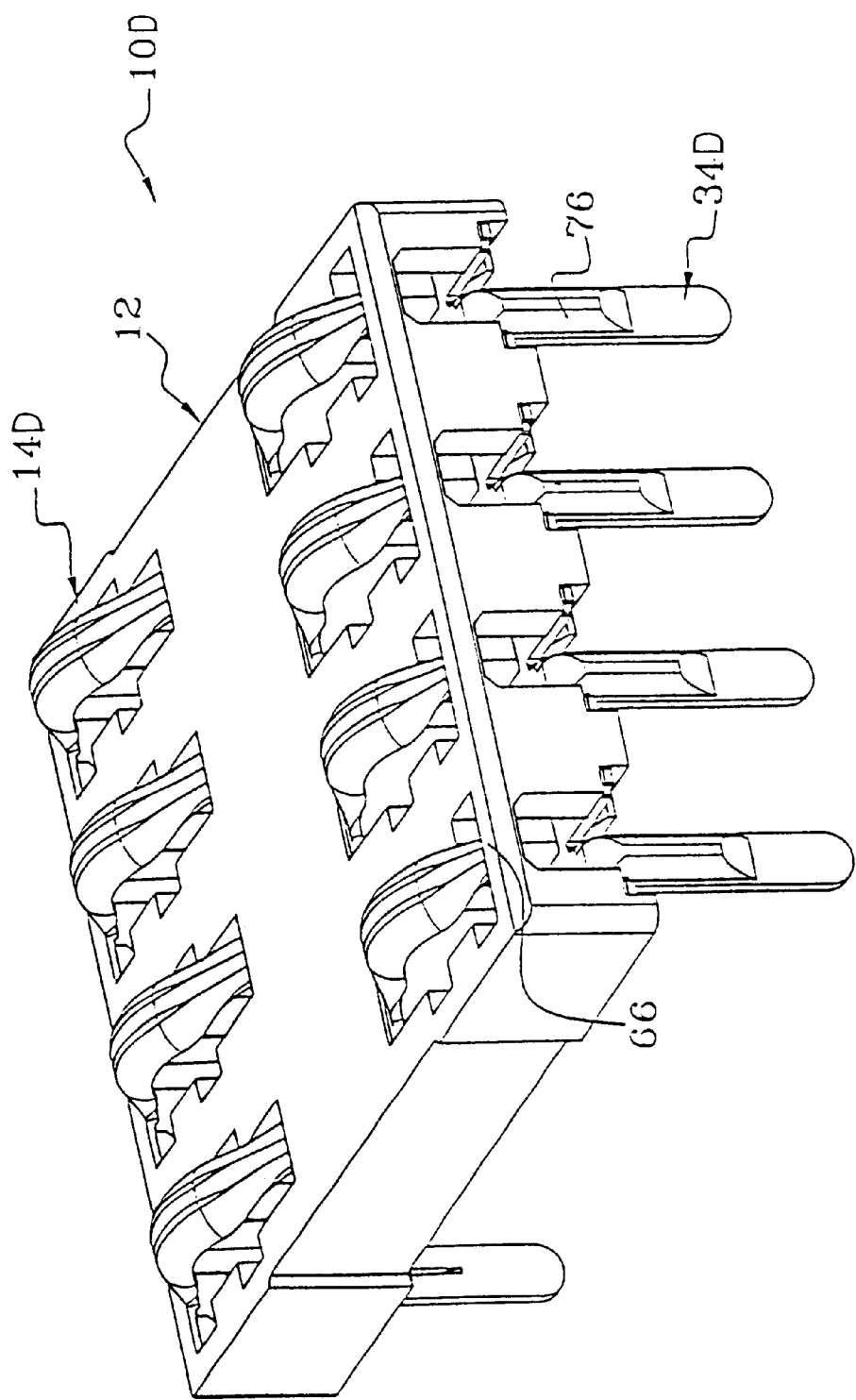
FIG. 16 is a top isometric view of a connector with contacts of a type illustrated in FIG. 11.
Figure 17:
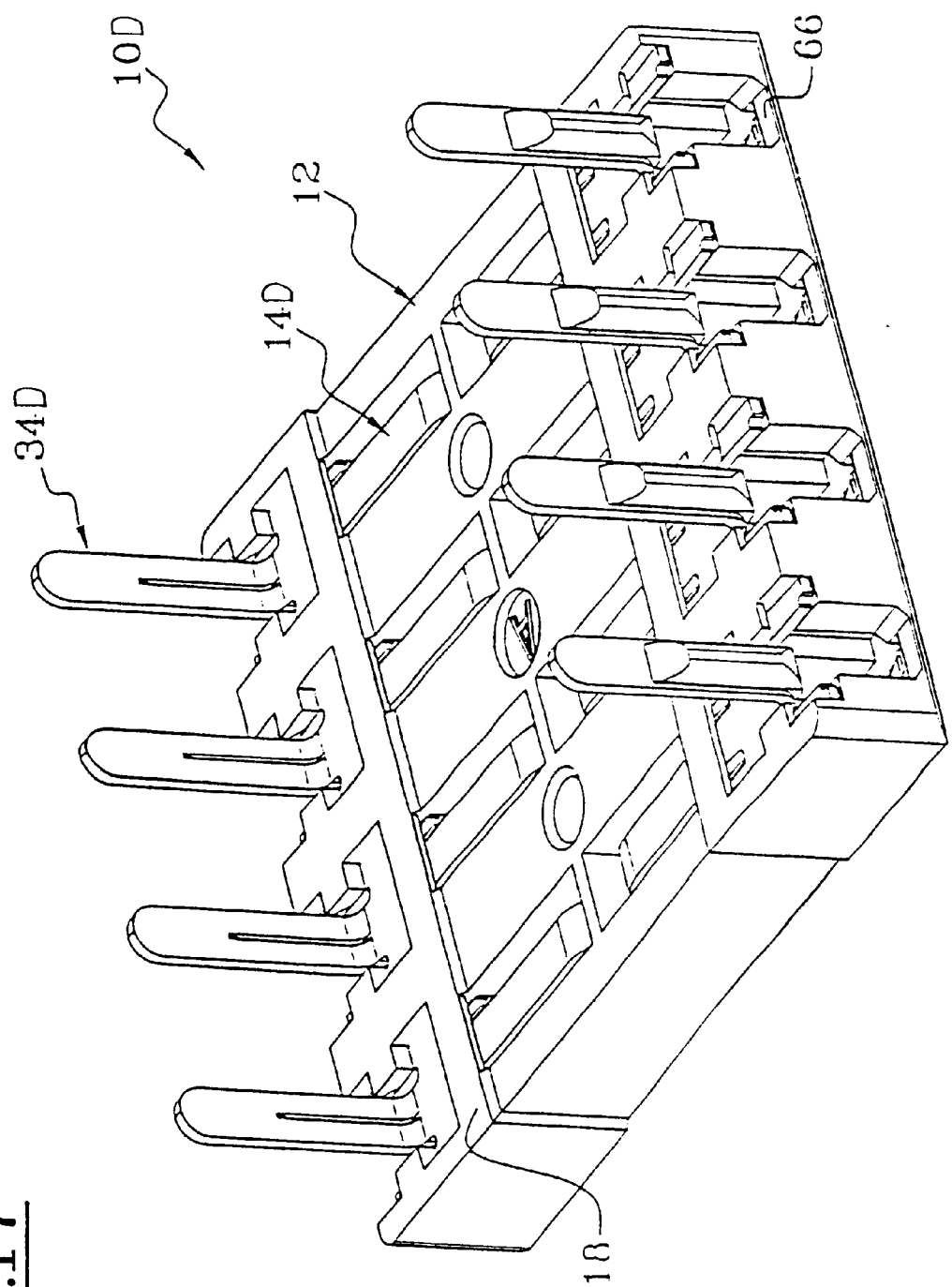
FIG. 17 is a bottom isometric view of the connector of FIG. 16.

FIG. 11 illustrates a contact 14D with a termination tab 34D designed to be inserted into a hole in a circuit board. That is, the tab 34 extends vertically downward and perpendicular to the plane of the lower branch 40. The tab 34D is rigidized by a rib 76. FIGS. 16 and 17 show a connector 10D which is identical to the connector of FIG. 1, except that the contacts 14D have the downwardly-extending tabs 34D.

Figure 18:
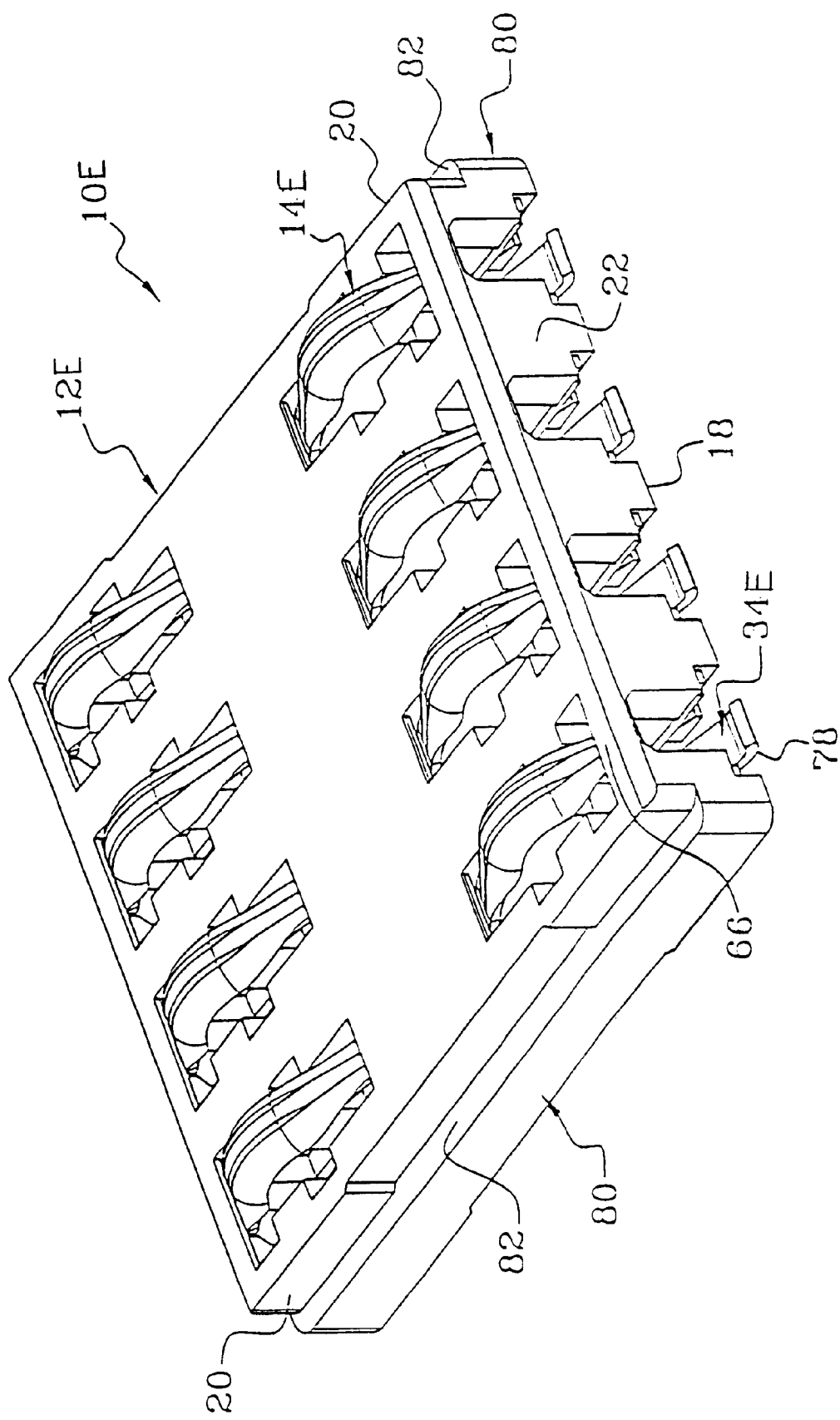
FIG. 18 is a top isometric view of a connector with contacts of the type illustrated in FIG. 12.
Figure 19:
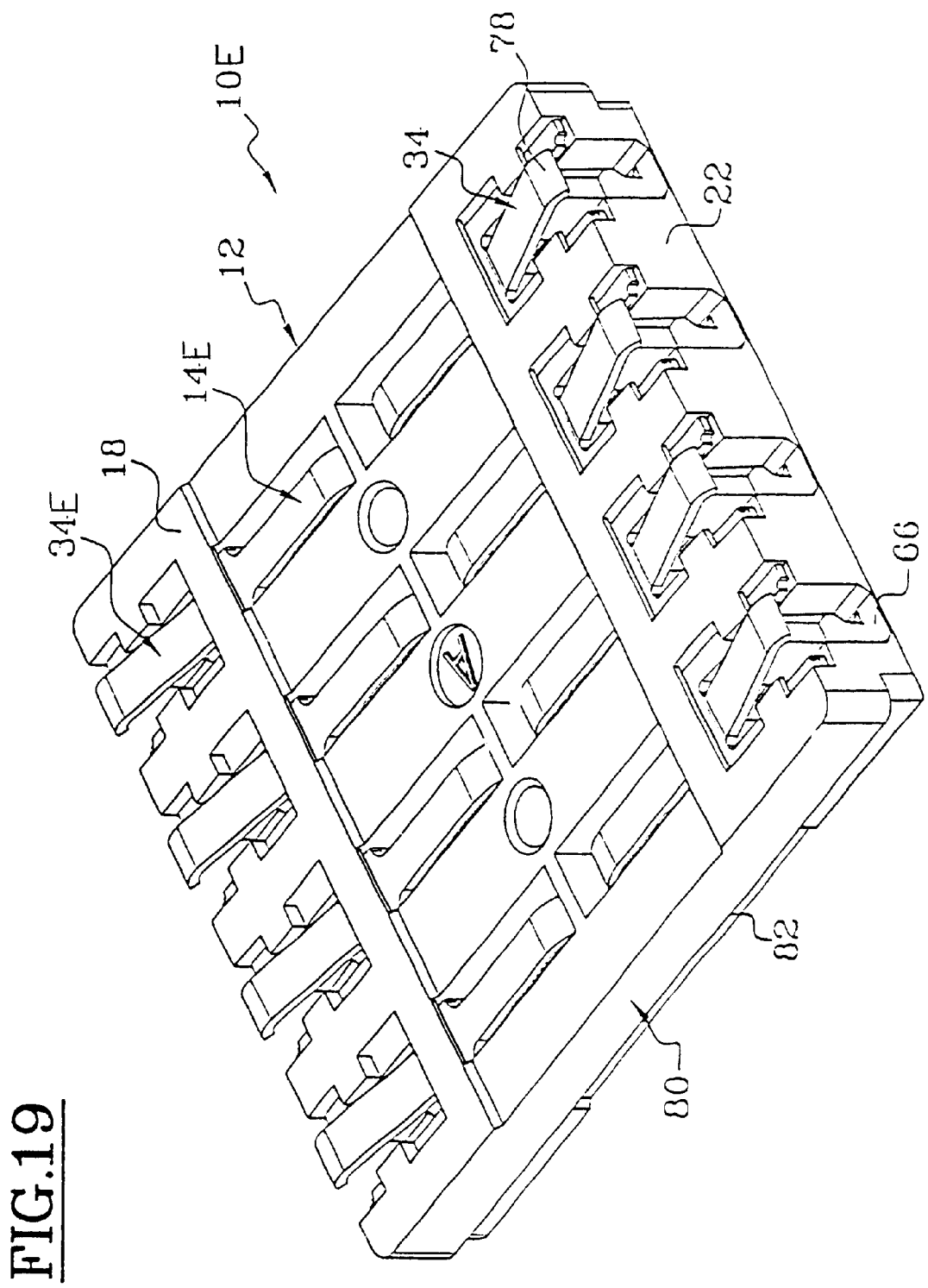
FIG. 19 is an isometric bottom view of the connector of FIG. 18.
Figure 20:
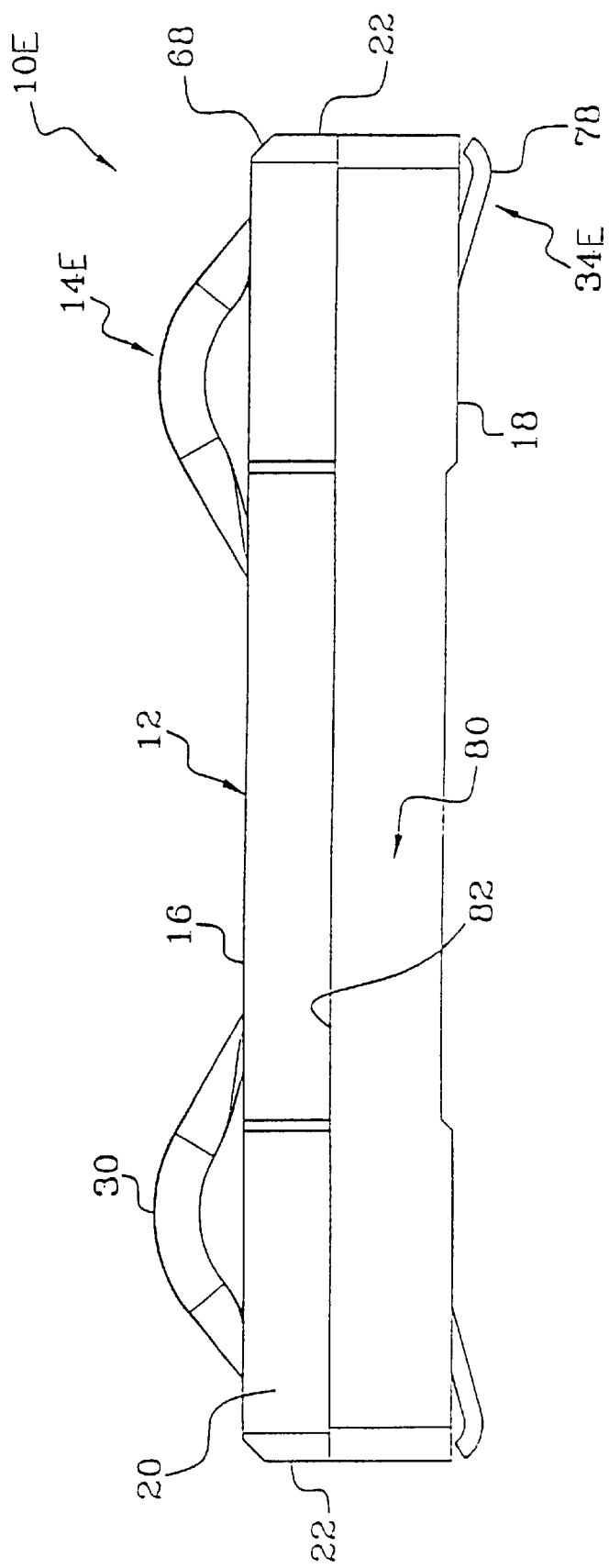
FIG. 20 is a side elevation view of the connector of FIG. 18.
Figure 21:
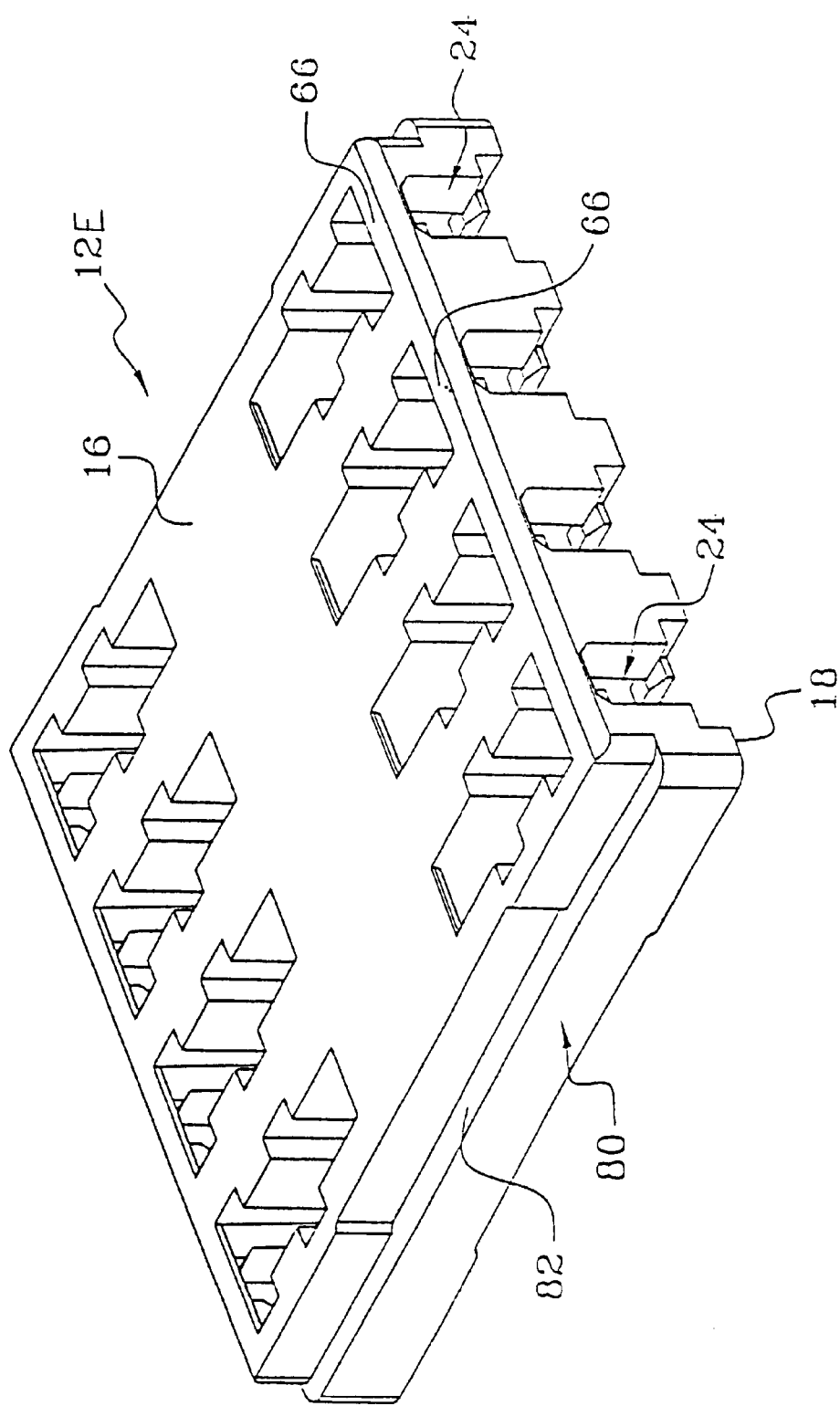
FIG. 21 is a top isometric view of the body of the connector of FIG. 18.
Figure 22:
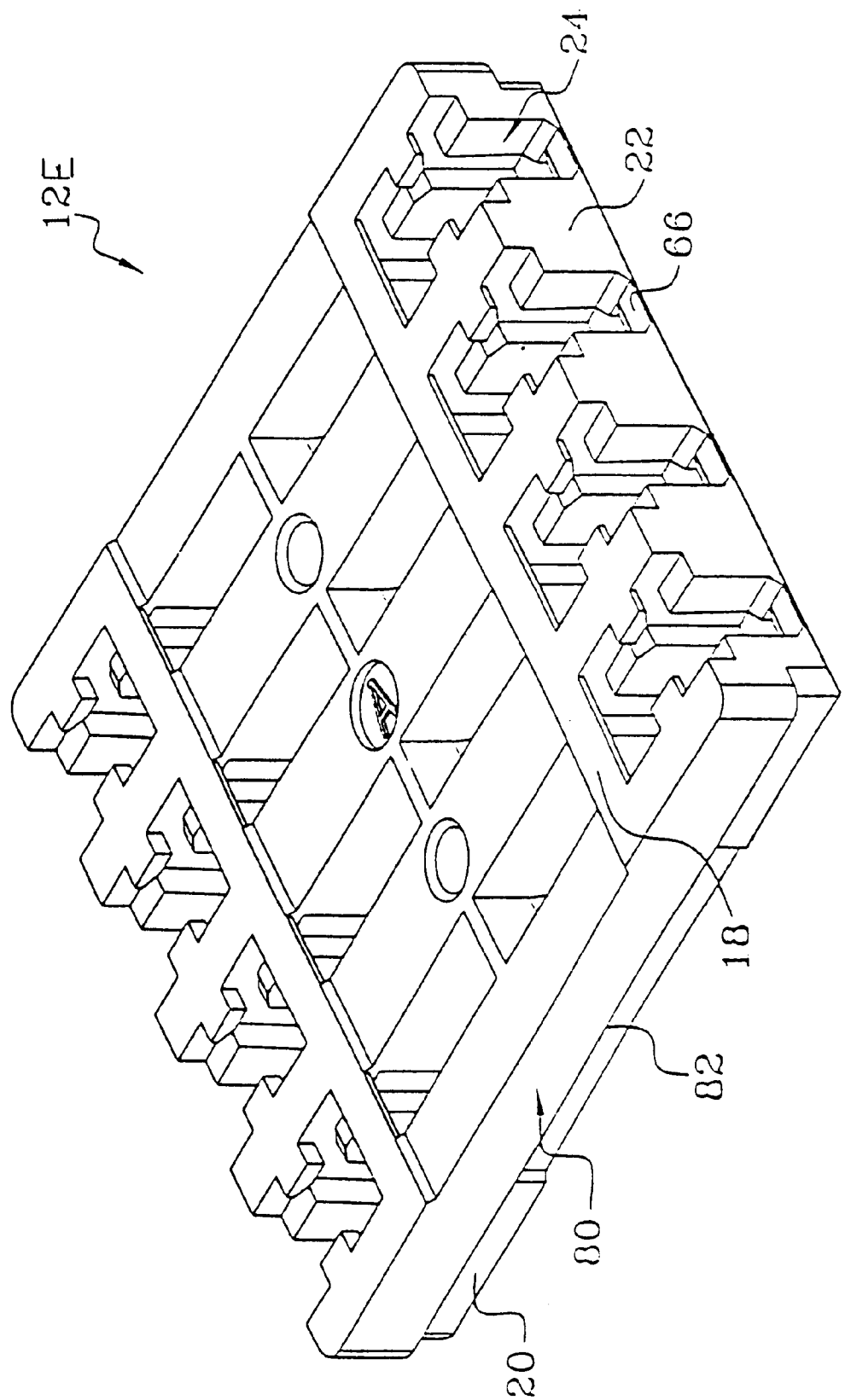
FIG. 22 is a bottom isometric view of the body of FIG. 21.
Figure 23:
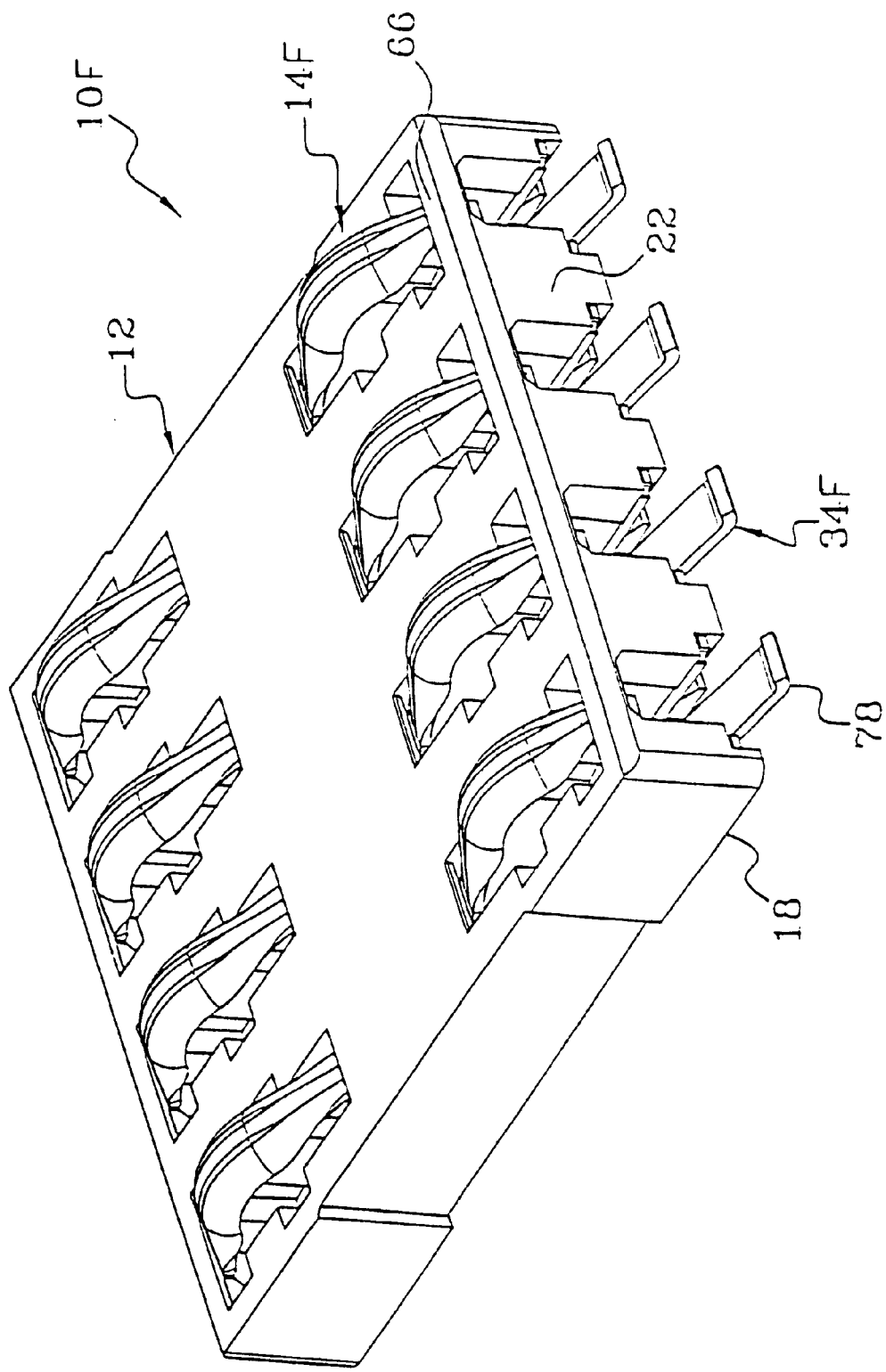
FIG. 23 is a top isometric view of a connector with contacts of the type shown in FIG. 13.
Figure 24:
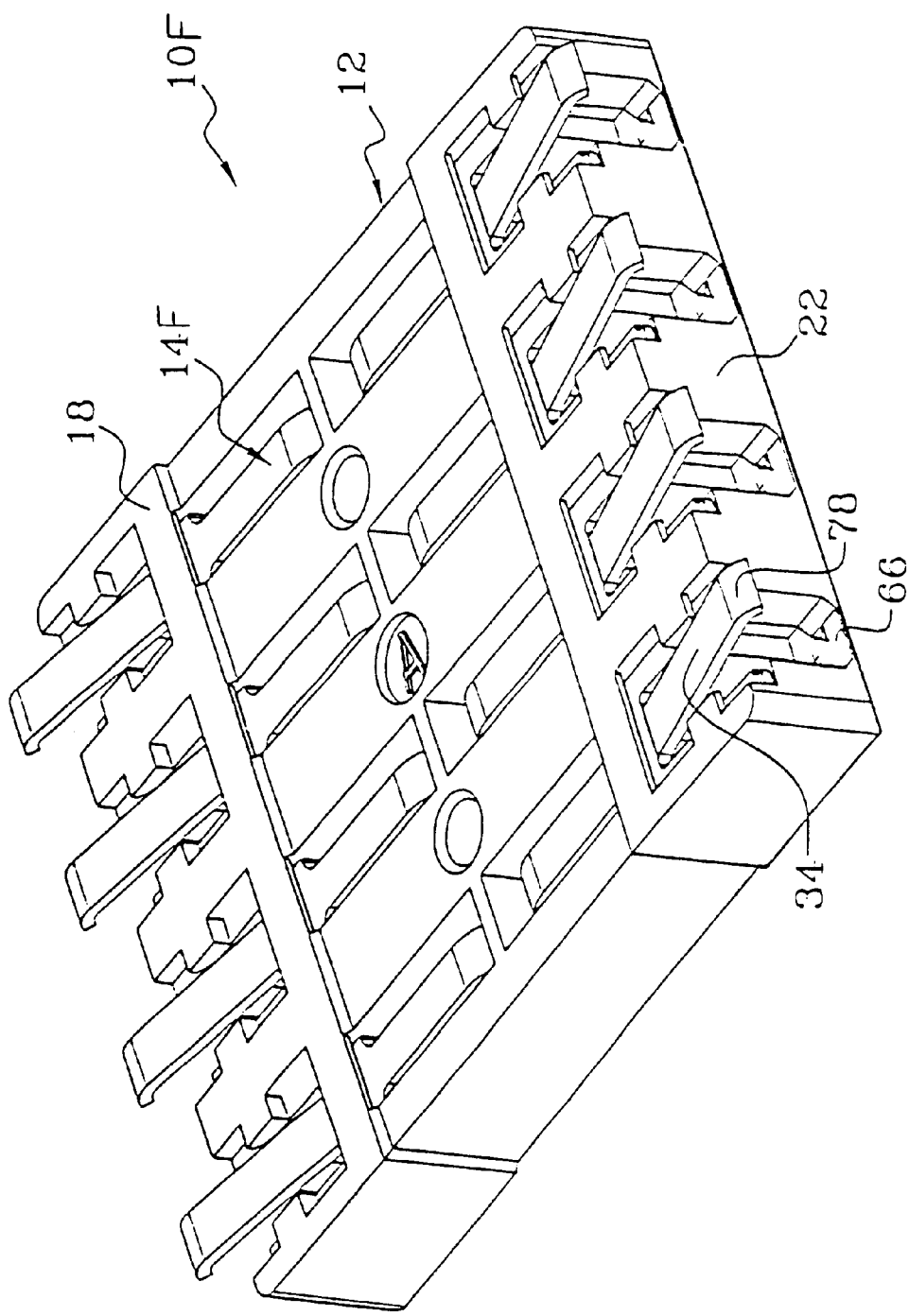
FIG. 24 is a bottom isometric view of the connector of FIG. 23
Figure 25:
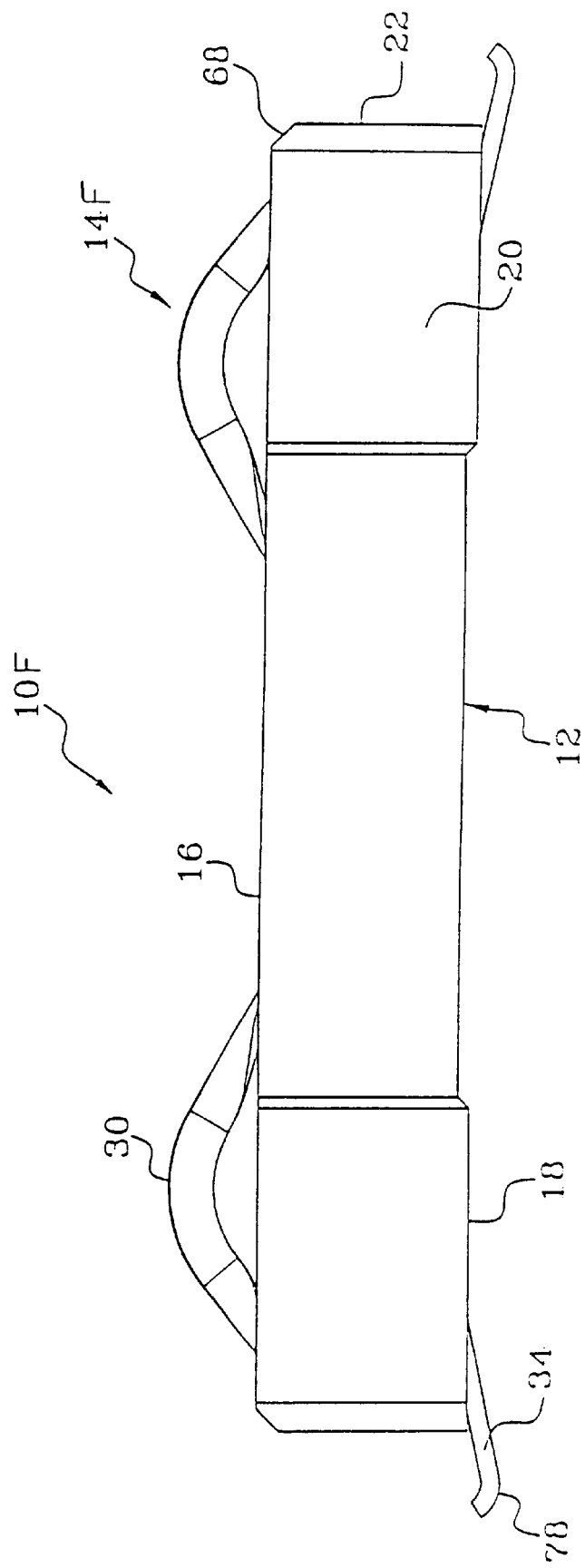
FIG. 25 is a side elevation view of the connector of FIG. 23

FIG. 12 illustrates another contact 14E with a termination tab 34E designed for solderless engagement with a trace on a circuit board or the like. The tab 34E extends at a downward-rearward incline from the horizontal, at an acute angle to the horizontal plane of the lower branch 40. The tab has a rear free end 78 that has a convex lower surface. As shown in FIGS. 18 and 19, the contacts 14E are short and are located entirely within the boundaries of the body 12E, as would be seen in a top or bottom view of the connector.

FIGS. 18–22 show that the connector 10E has a body 12E with a rim 80 (FIG. 18) that extends along the entire length of each of the laterally opposite sides of the body. The rim forms upper bearing surfaces 82 that can be pushed down by a casing to push the resilient inclined termination tabs 34E against the circuit board. Such casing, such as the guide shown in FIG. 1, also forms a slot that guides opposite edges of the smart card to its final position wherein pads of the card engage contacts of the connector.

FIG. 13 shows another contact 14F with a longer termination tab 34F for greater resilience. The longer tabs also facilitate test operations where probes contact the tabs. FIGS. 23–28 illustrate a connector 10F with the contacts mounted in the body.

Figure 26:
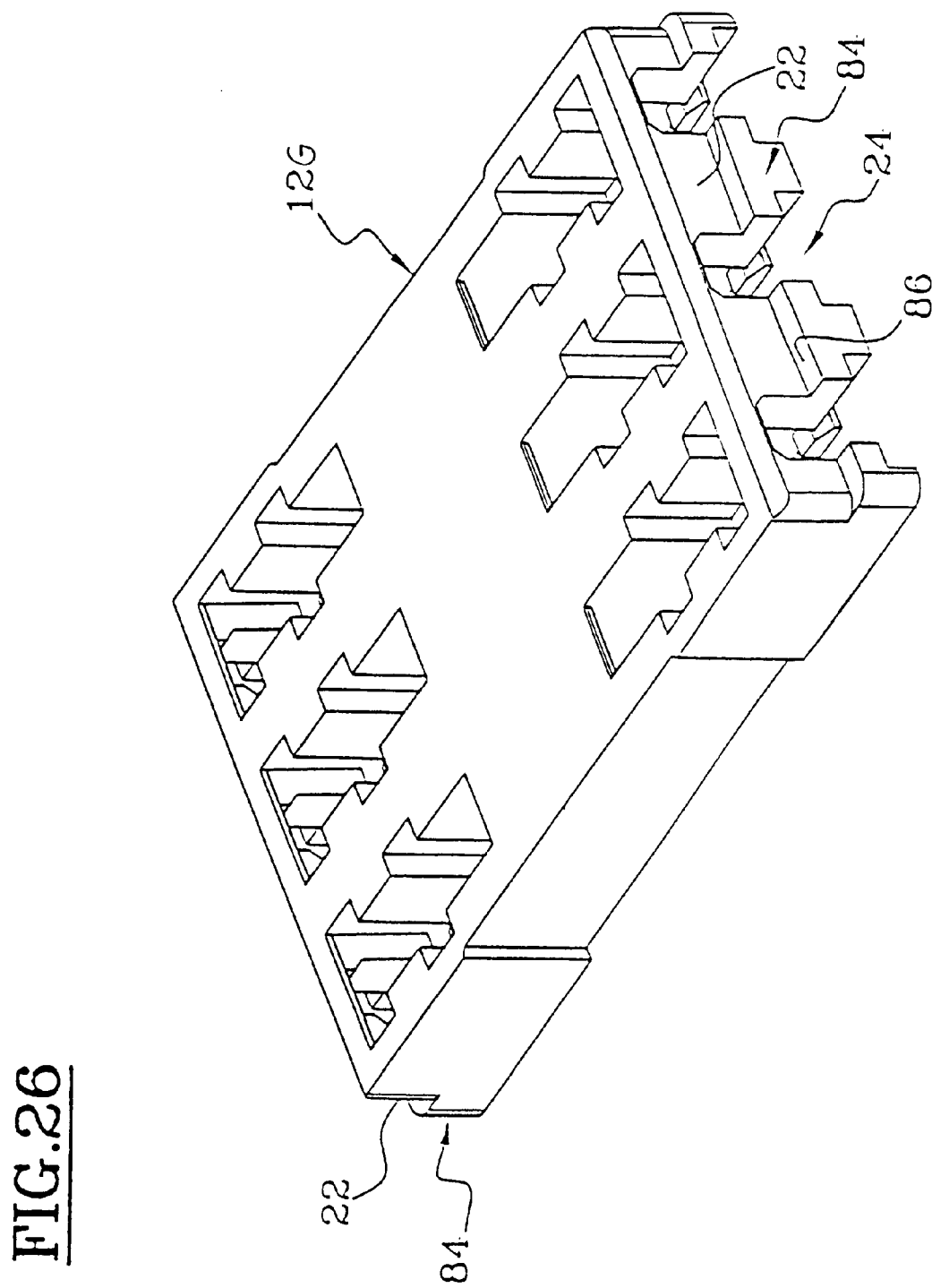
FIG. 26 is a top isometric view of a connector body with three pairs of cavities.
Figure 27:
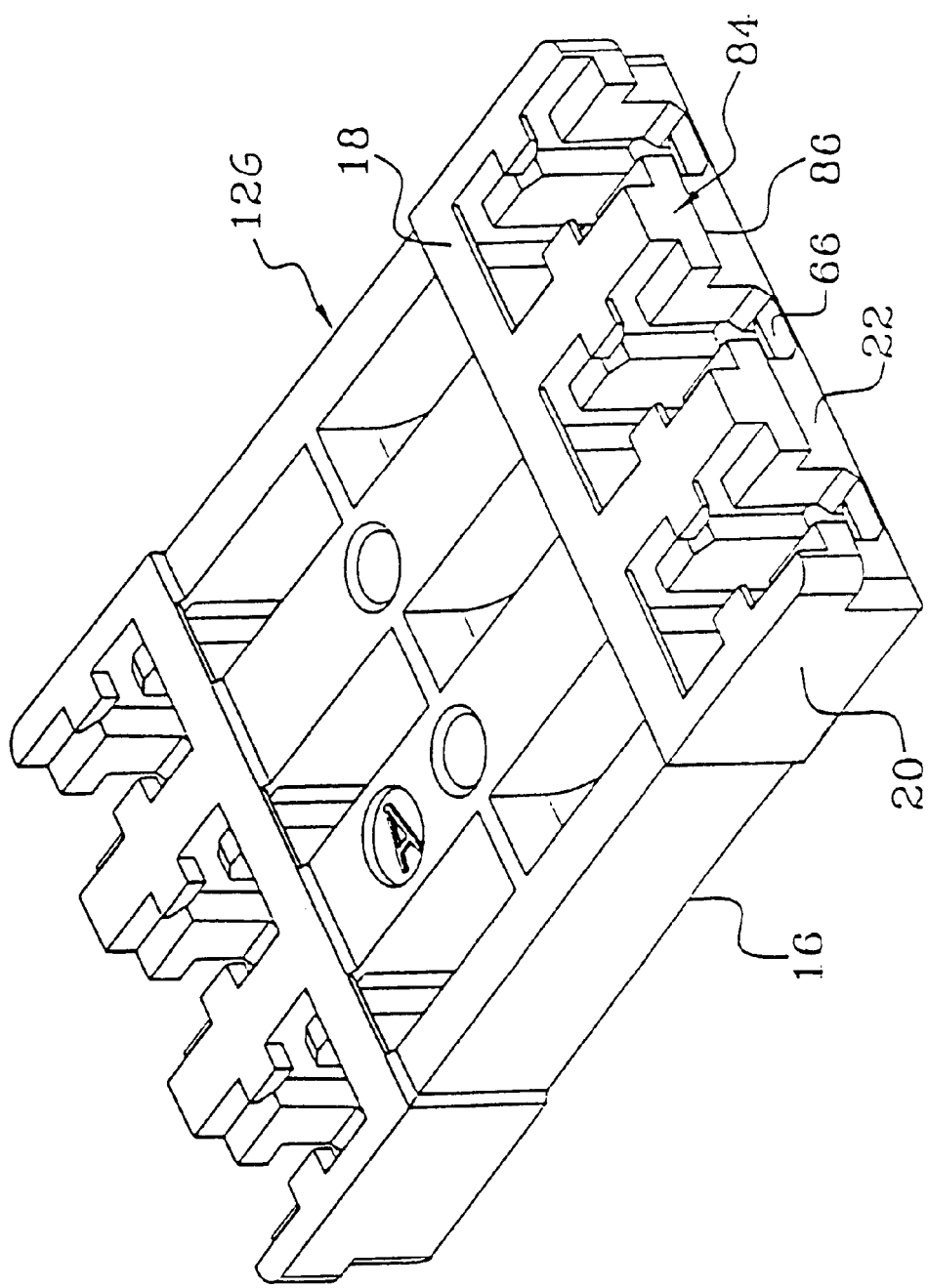
FIG. 27 is a bottom isometric view of the body of FIG. 26.
Figure 28:
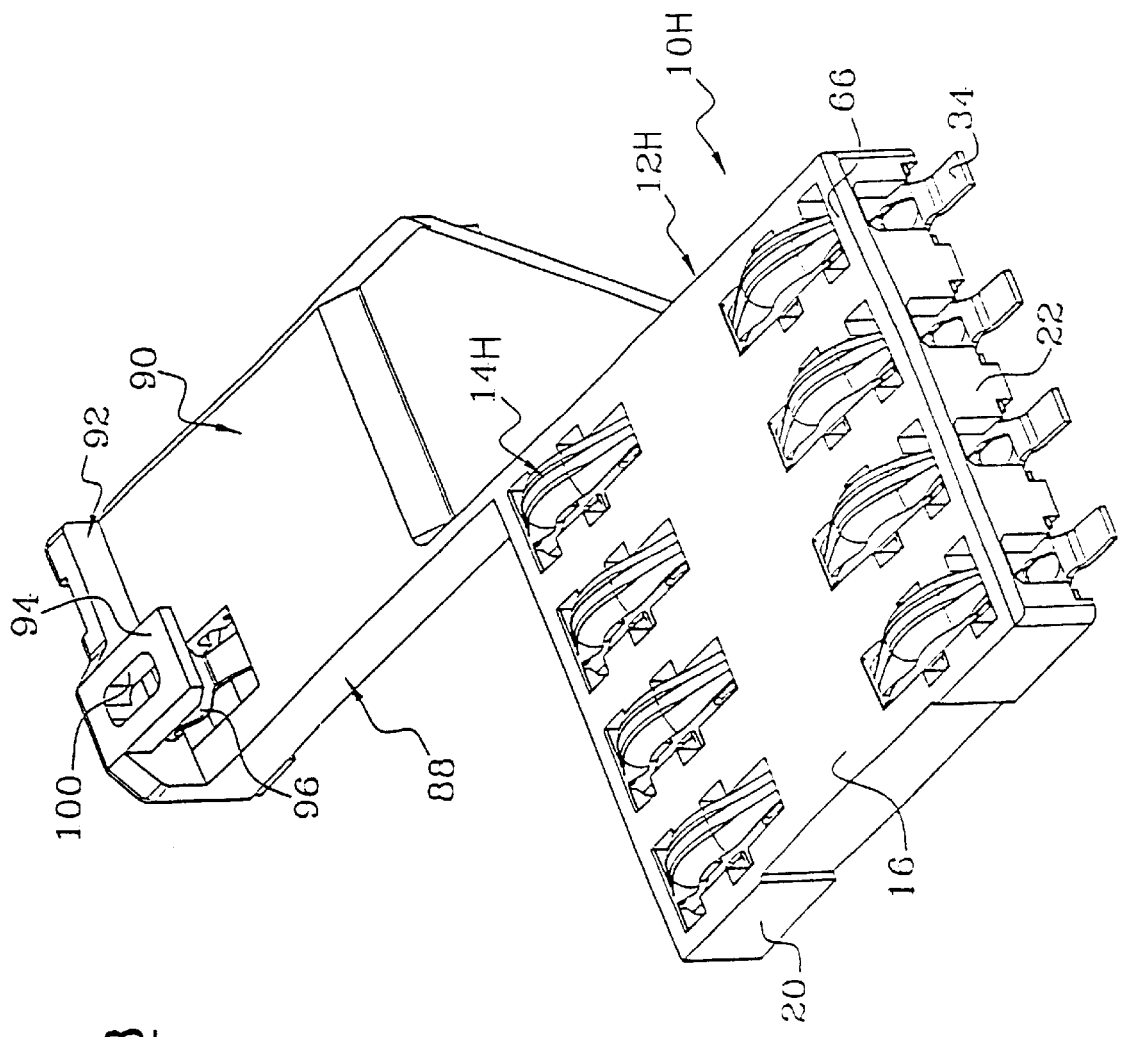
FIG. 28 is a top isometric view of a connector which includes an integrated switch for detecting the presence of a card.
Figure 29:
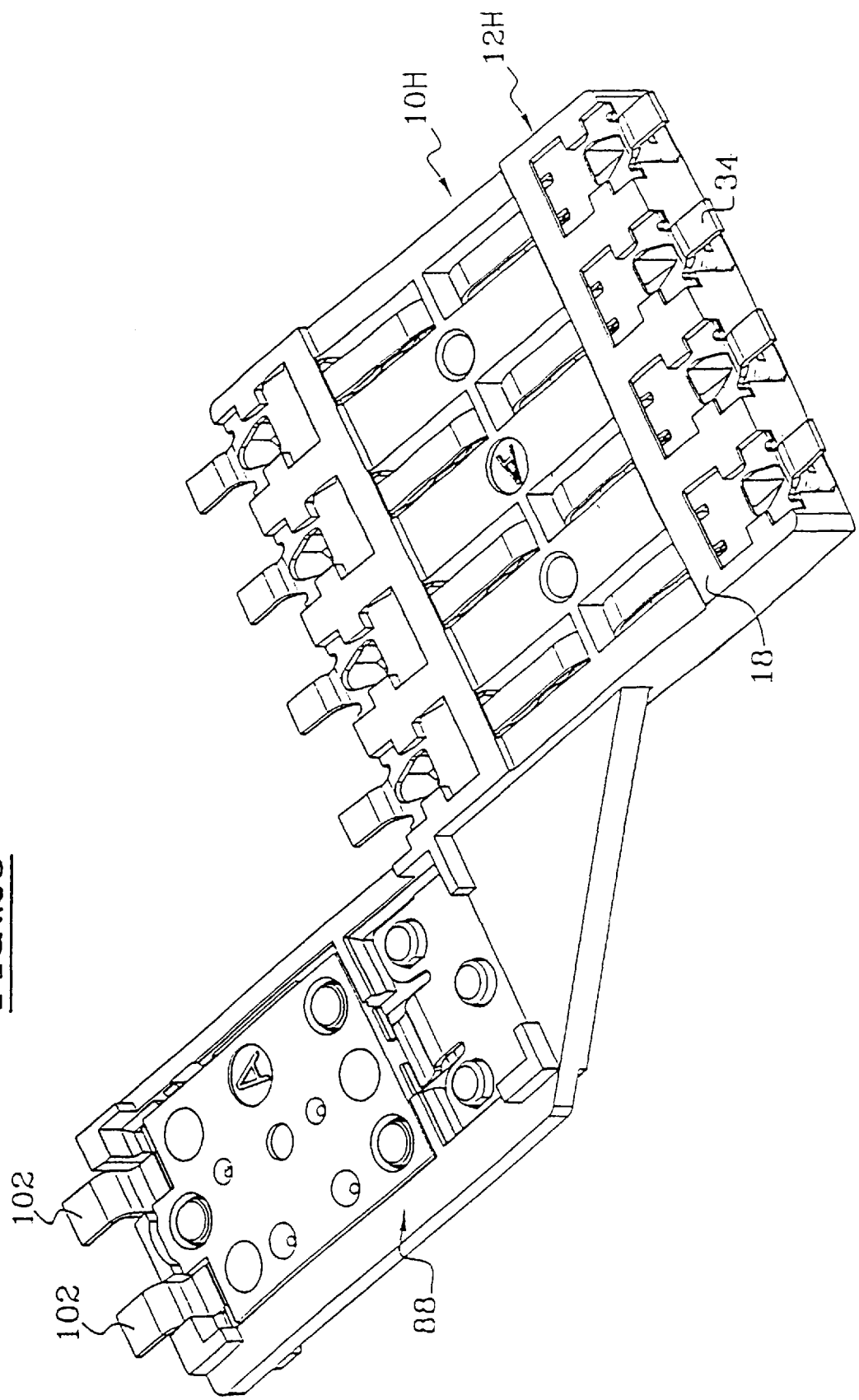
FIG. 29 is a bottom isometric view of the connector of FIG. 28.
Figure 30:
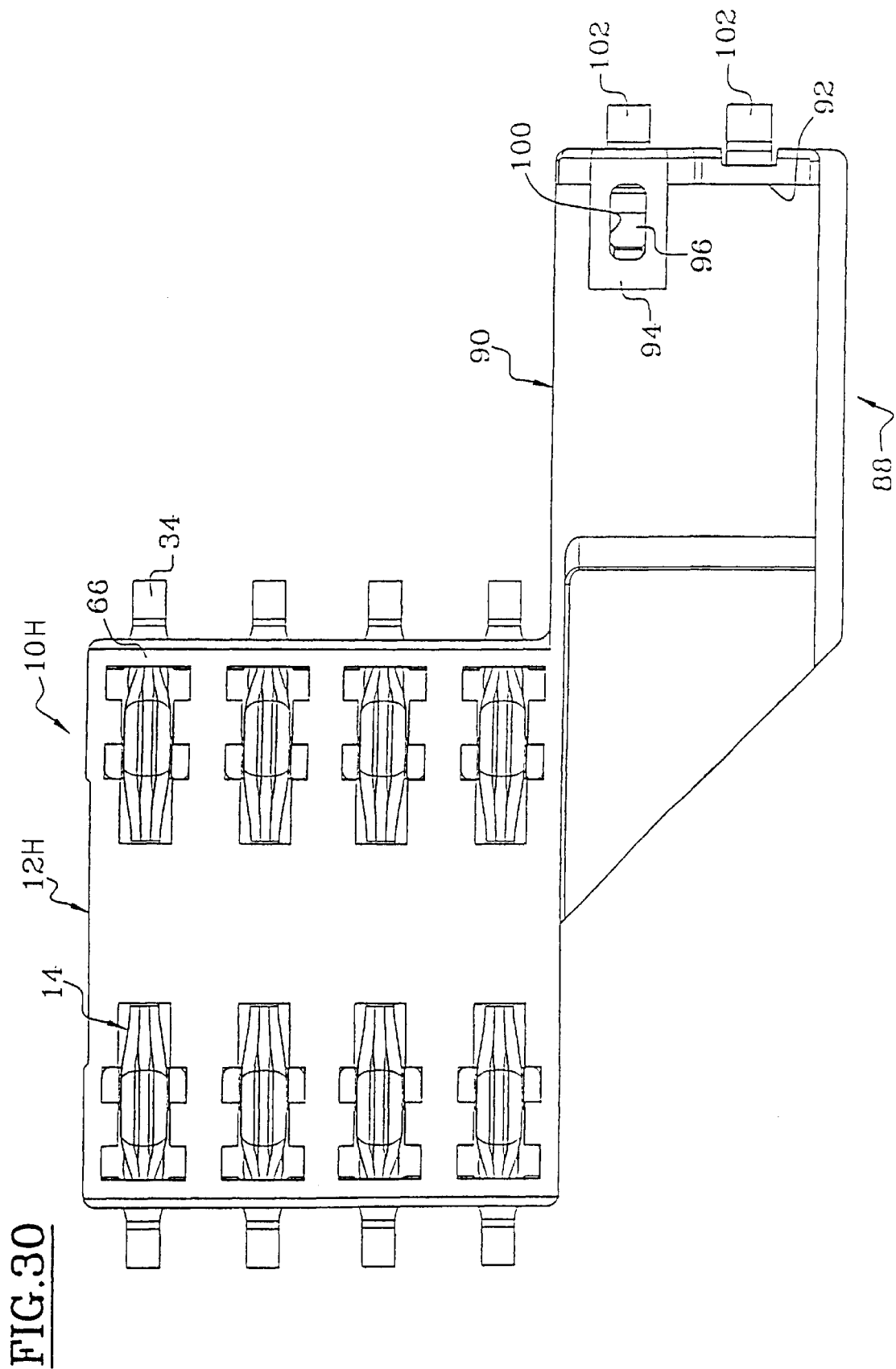
FIG. 30 is a top view of the connector of FIG. 28.
Figure 31:
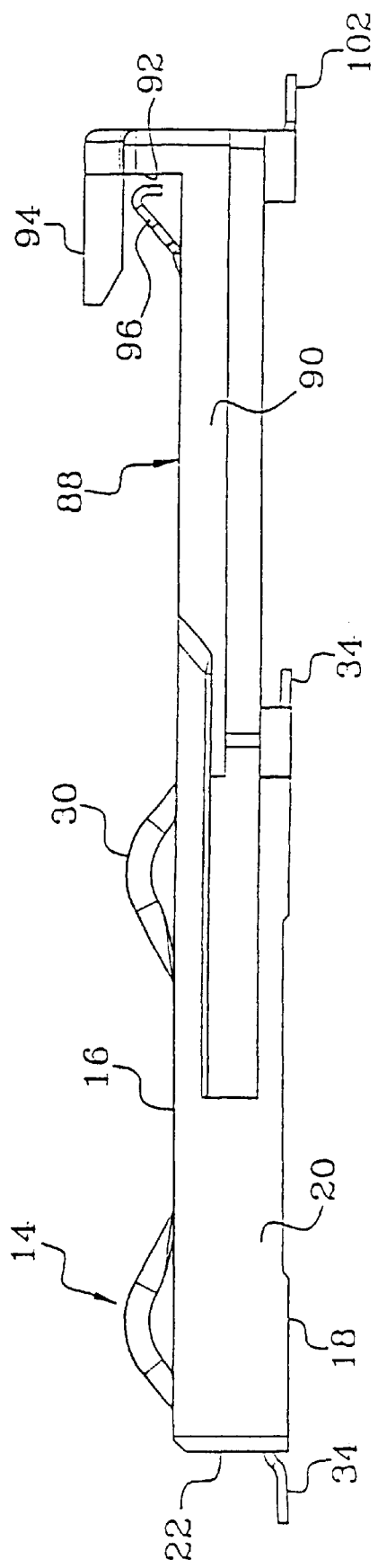
FIG. 31 is a side elevation view of the connector of FIG. 28.
Figure 32:
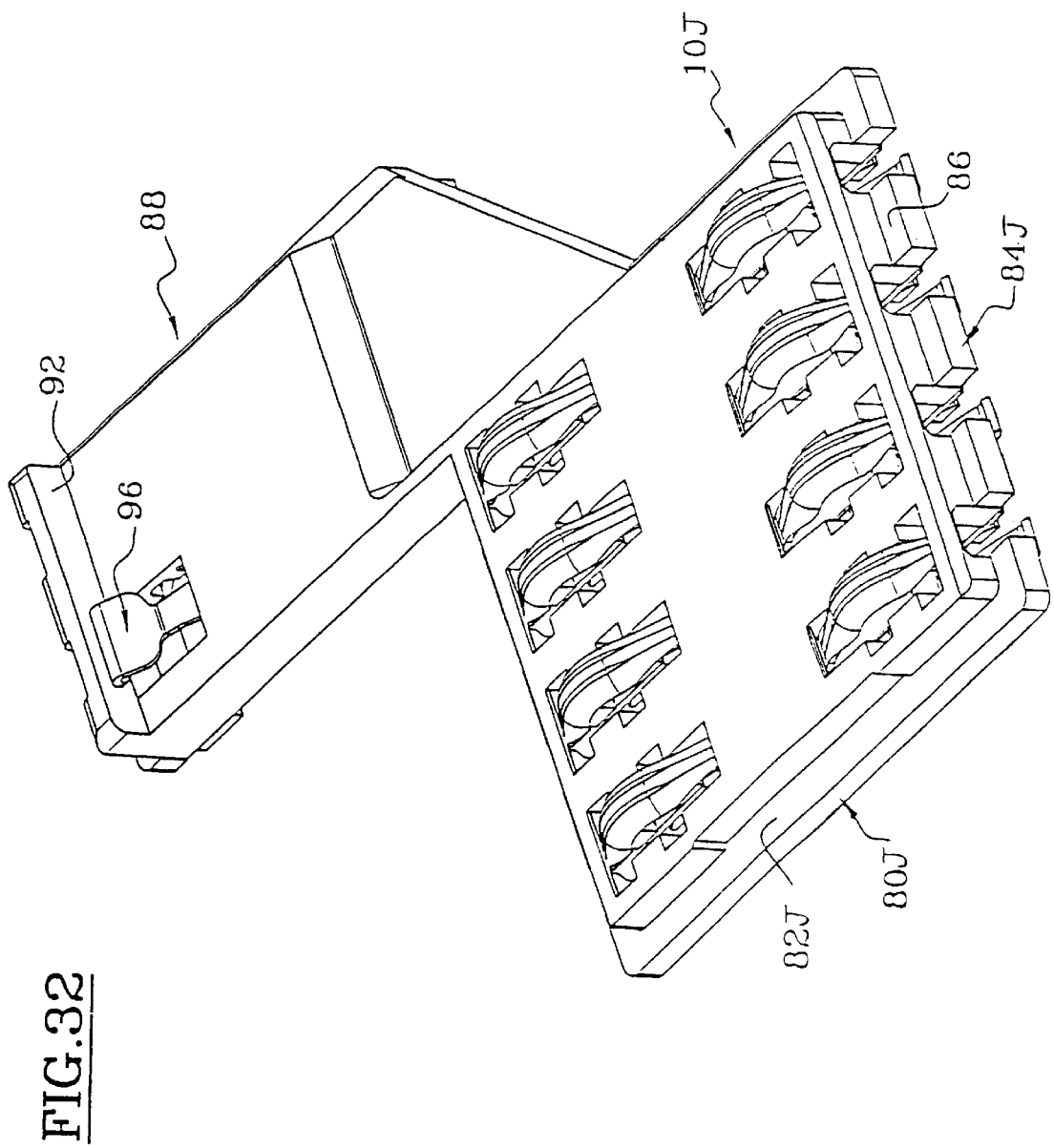
FIG. 32 is a top isometric view of another connector that includes an integrated switch.

FIGS. 26 and 27 illustrate a body 12G with rims 84 that extend along longitudinally opposite ends of the body, with each rim forming an upper bearing face 86. The upper bearing face is interrupted by the contact receiving cavities 24. This design has the advantage that it allows a plurality of connectors with bodies of the shape 12G to be laid in a laterally-extending row, which is possible because the rims 84 are at the ends of the bodies rather than their laterally opposite sides.

FIGS. 28–31 show an electrical connector 10H that includes a switch 88 for detecting the presence of the leading edge of a card when it is in its fully inserted position. The connector includes a switch body part 90 that is molded together with the rest of the insulating body 12H. The body part 90 has a stop 92 that limits forward insertion of the card. The body part also has a roof 94 for holding down the leading edge of the card as it depresses an actuating pedal 96 of the switch 88. The roof has a hole 100 that is useful for testing the switch by inserting a thin object through the hole to depress the pedal. The rest of the connector is otherwise similar to that of the connector of FIG. 1.

FIGS. 32–35 illustrates another connector 10J with a switch 88, but without a roof over the actuator 96. The connector body has rims 80J at laterally opposite sides that form upwardly facing surfaces 82J. The contacts have resiliently deflectable termination tabs.

Figure 33:
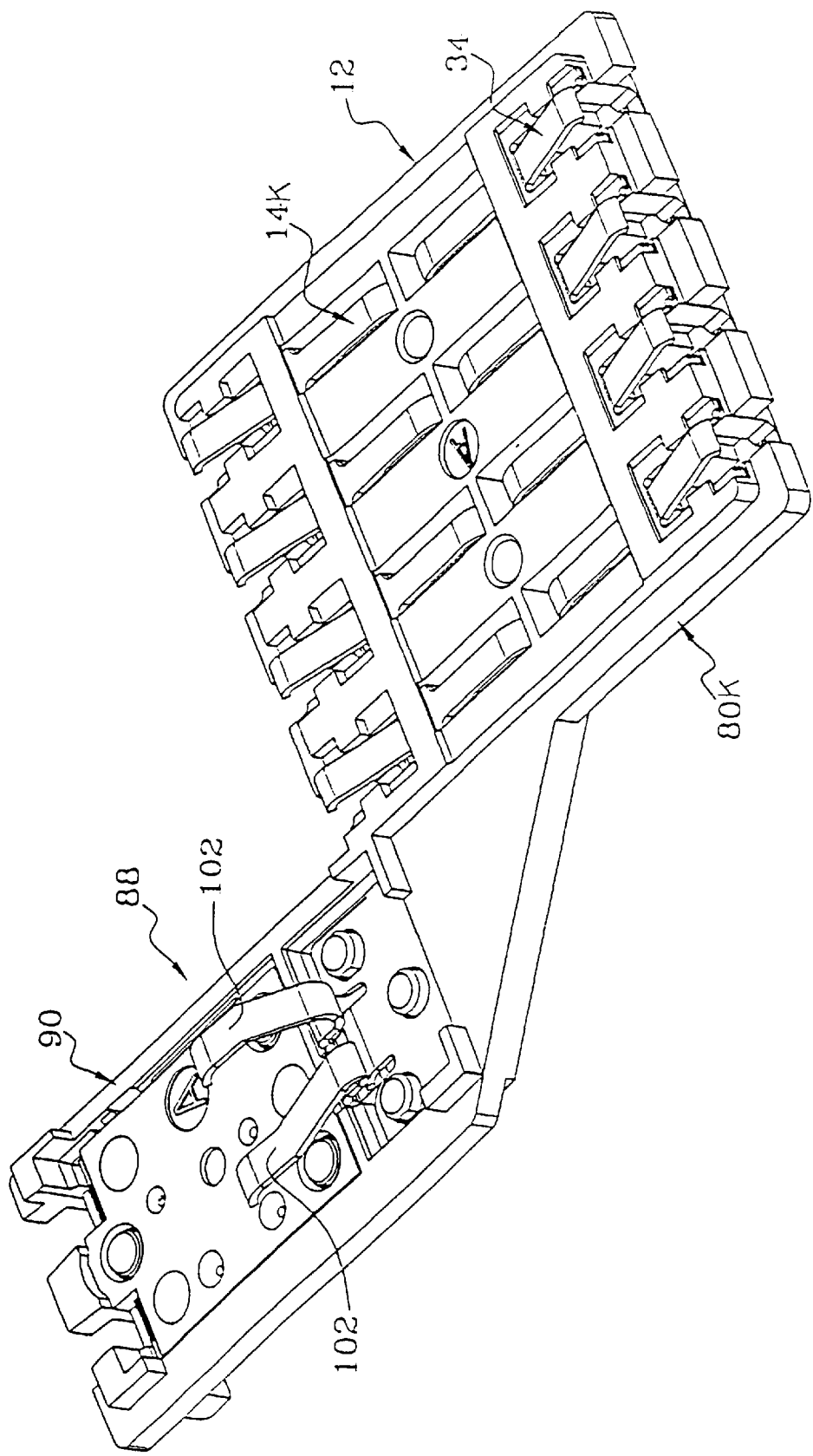
FIG. 33 is a bottom isometric view of the connector of FIG. 32.
Figure 34:
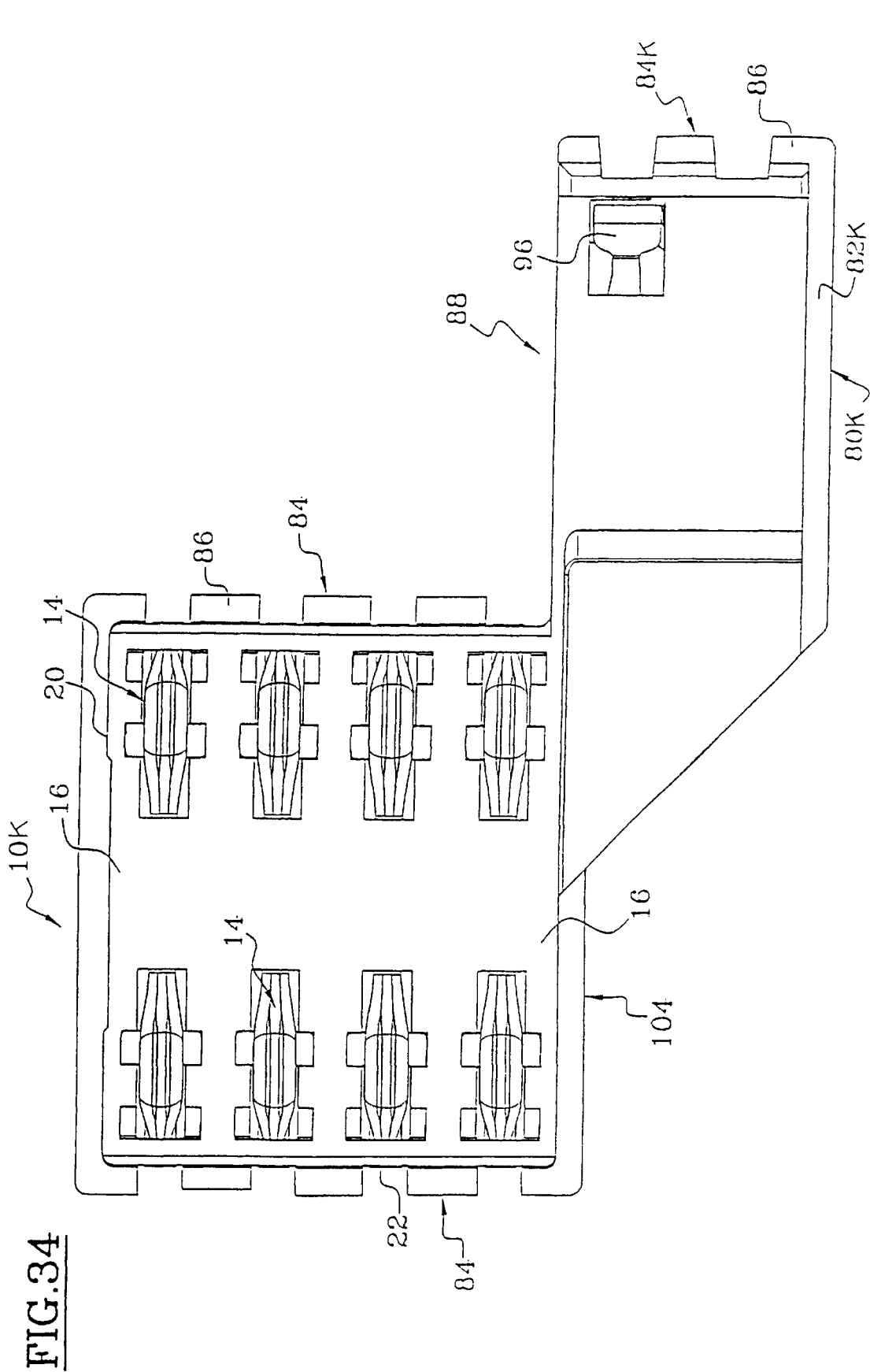
FIG. 34 is a top view of the connector of FIG. 32.
Figure 35:
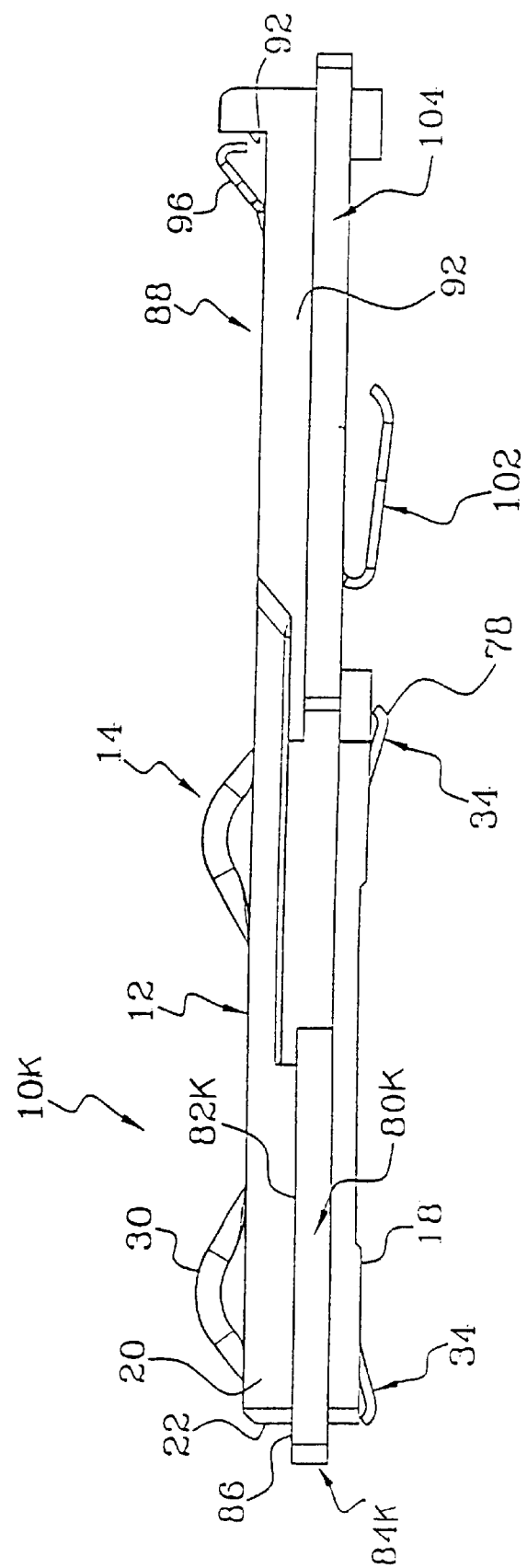
FIG. 35 is a side elevation view of the connector of FIG. 32.

FIGS. 33–35 show another connector 10K that has rims 80K, 84K with upper surfaces 82K. As shown in FIG. 33, the switch has a pair of switch contacts with tabs 102 that are located within the perimeter of the switch and that are resiliently deflectable against a trace on a circuit board. The contacts 14K of the connector are also resiliently deflectable. As shown is FIG. 34, the rims extend along one lateral side and one longitudinal end of the switch to help hold it and its switch tabs down against a circuit board.

Figure 36:
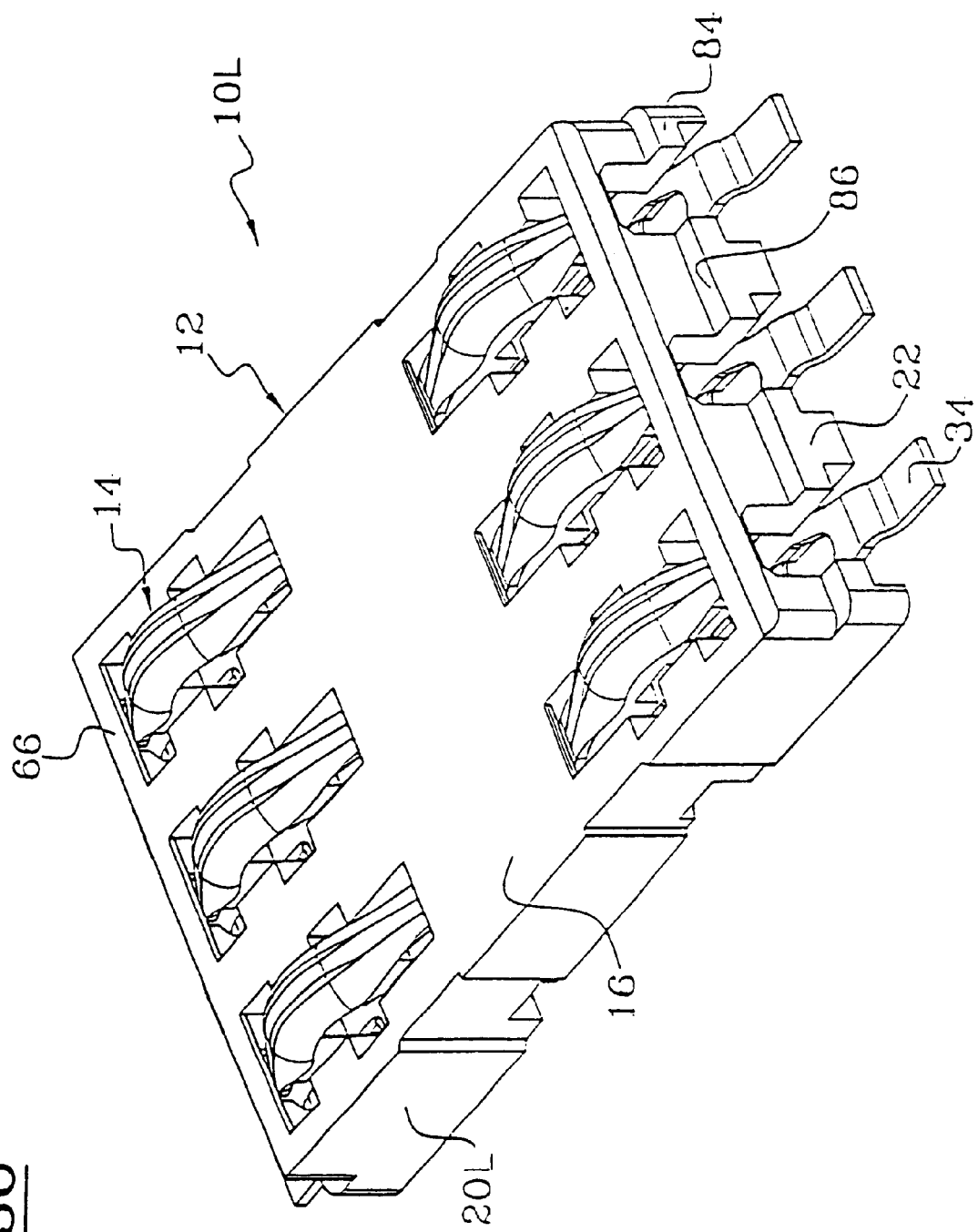
FIG. 36 is a top isometric view of a connector with a body of another embodiment of the invention.
Figure 37:
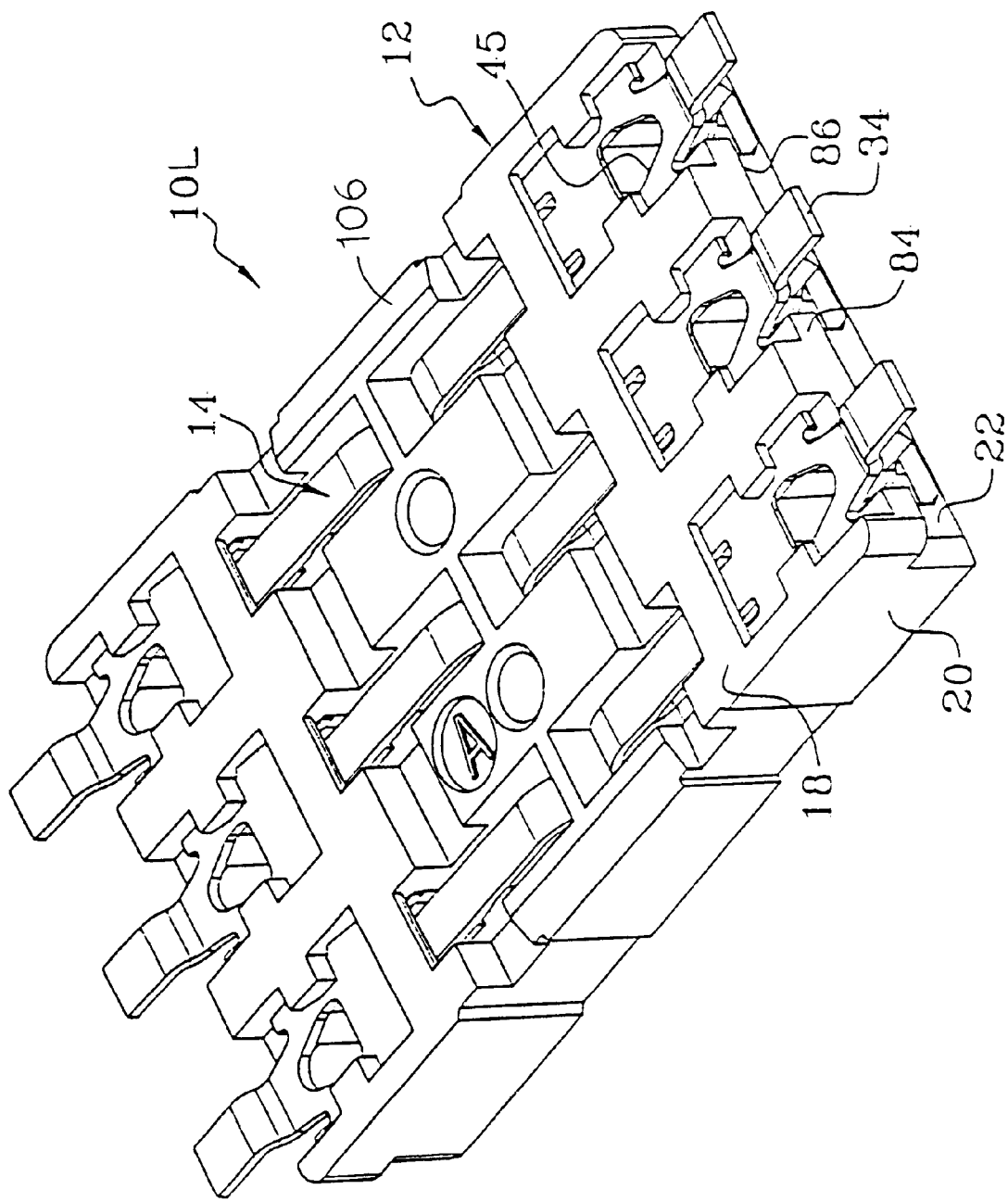
FIG. 37 is a bottom isometric view of the connector of FIG. 36.
Figure 38:
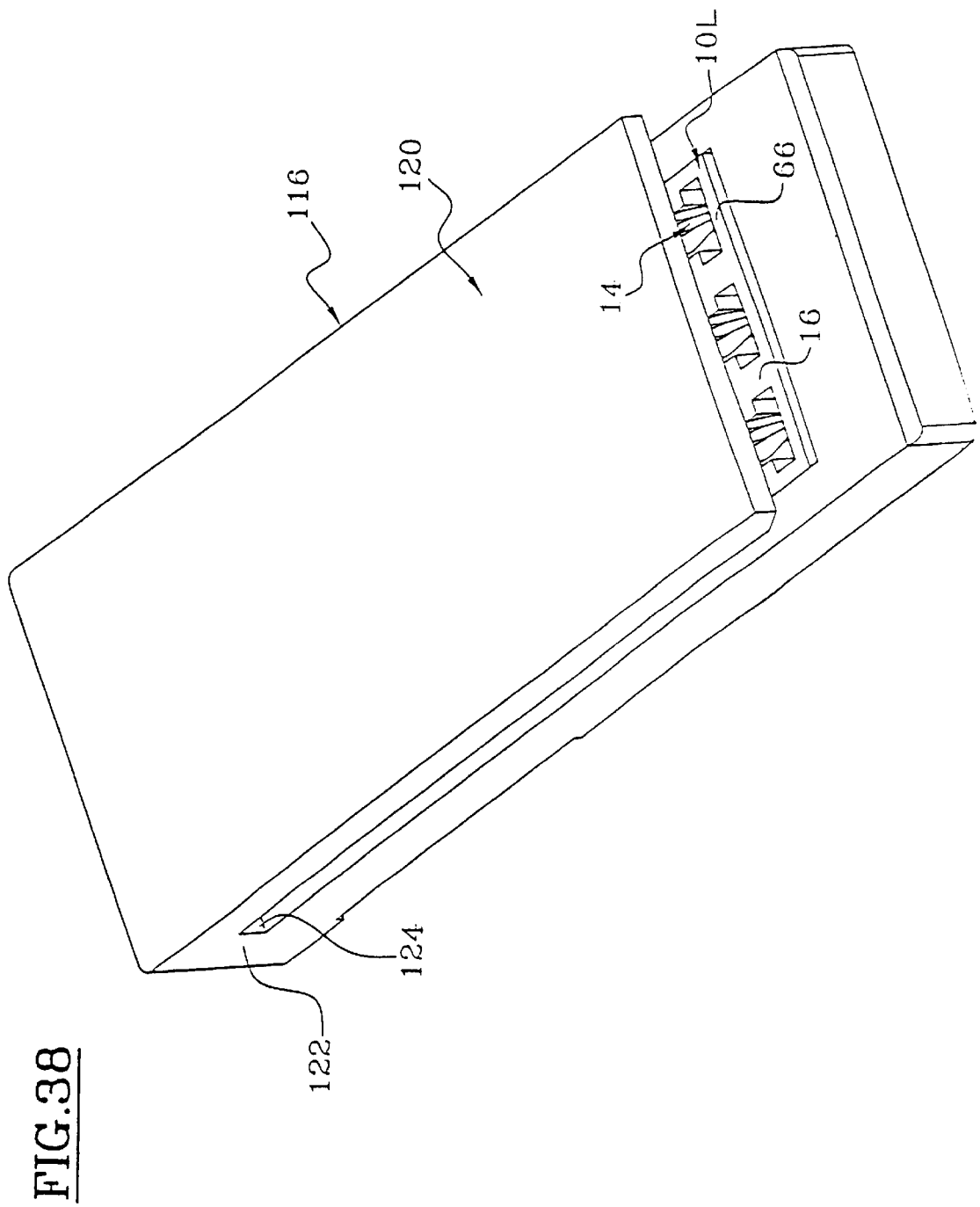
FIG. 38 is a top isometric view of a combination of a connector of another embodiment of the invention and a card-guiding casing.
Figure 39:
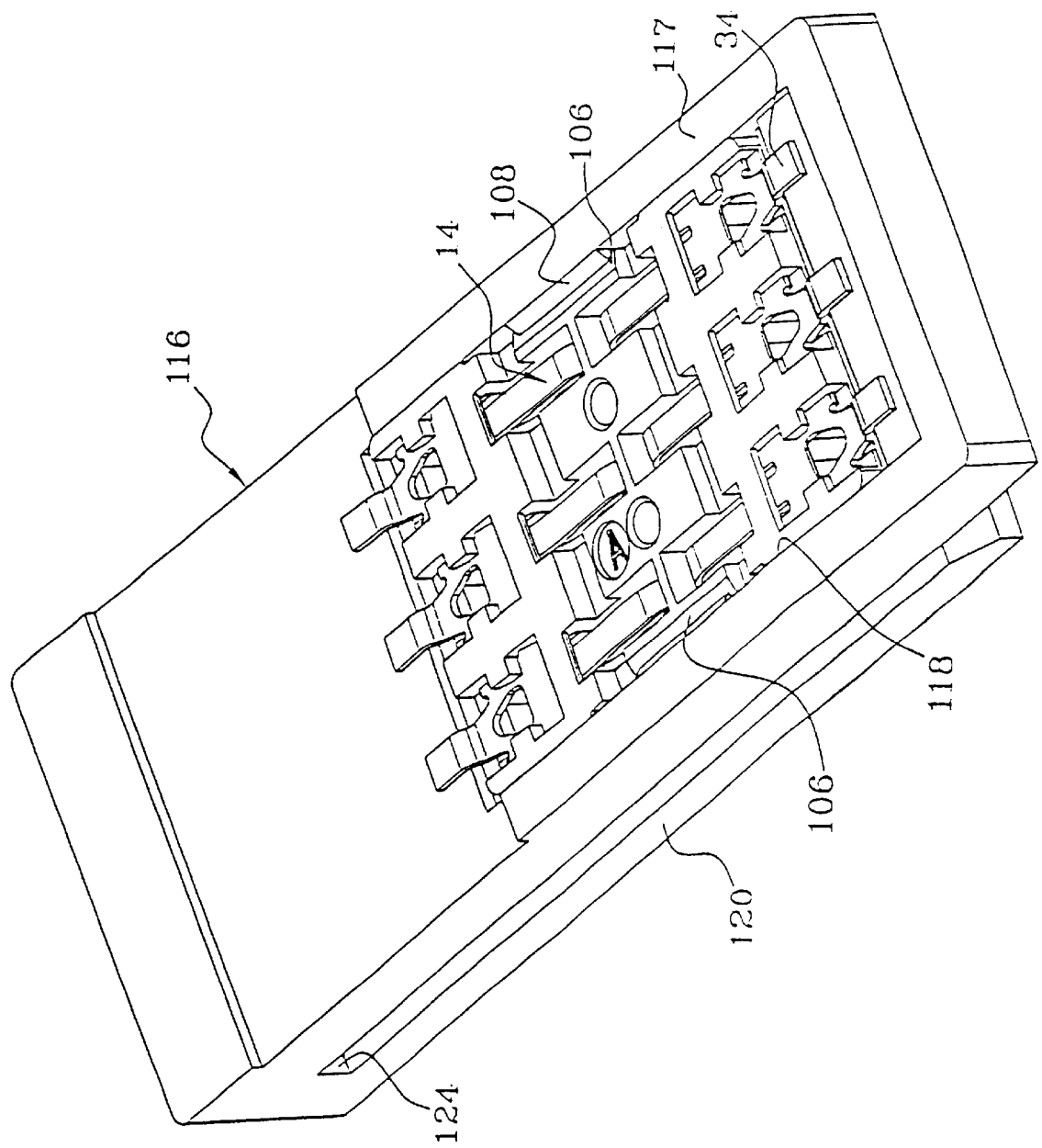
FIG. 39 is an isometric bottom view of the combination of FIG. 38.
Figure 40:
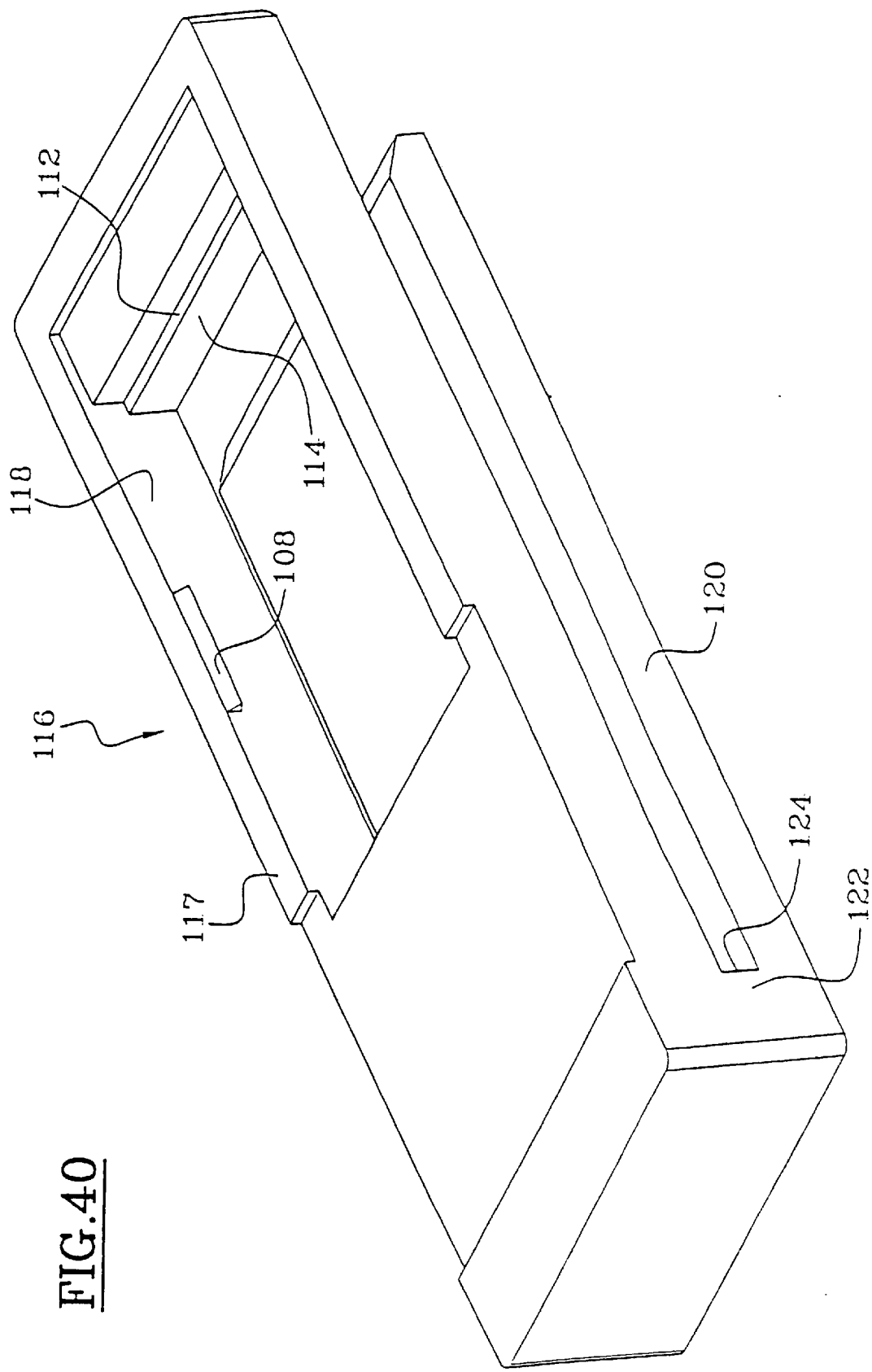
FIG. 40 is an isometric bottom view of the casing of FIG. 38.
Figure 41:
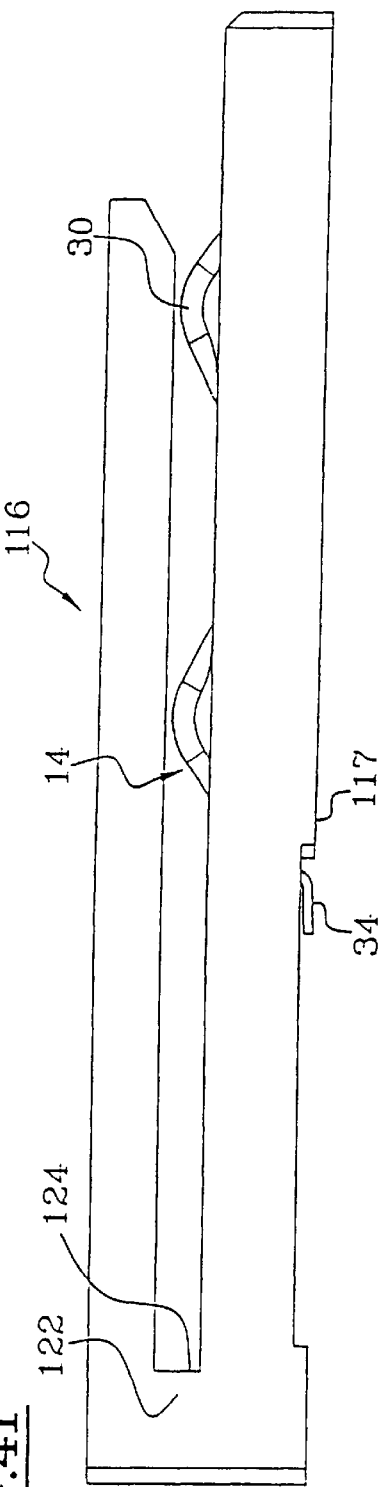
FIG. 41 is a side elevation view of the combination of FIG. 38.
Figure 42:
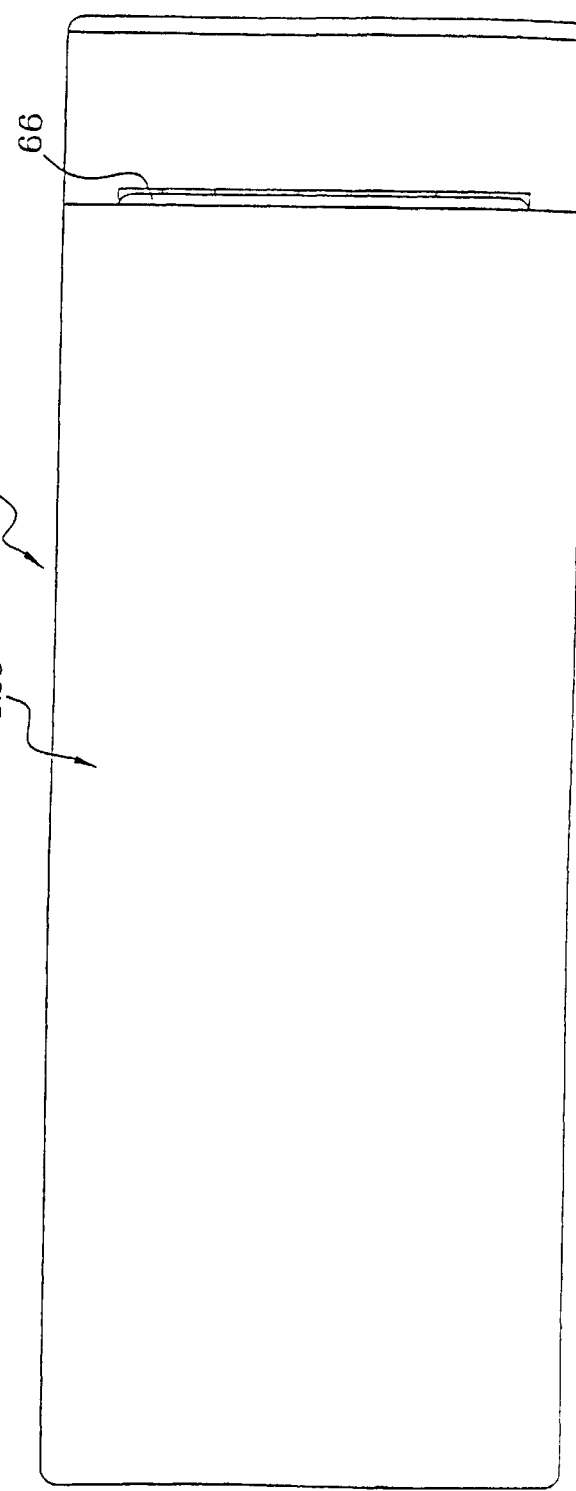
FIG. 42 is a top view of the combination of FIG. 38.

FIGS. 36 and 37 shown a connector 10L with laterally opposite faces 20L which are profiled with recesses such as notches 106 (FIG. 37) that allow snapping attachment of a casing. FIG. 38 shows a casing 116 that has been slid over the connector 10L, with the casing having an upper plate 120 joined by a wall 122 to a lower part of the casing, to form a card-receiving slot between them. As shown in FIG. 39, the casing has a hole or recess 118 in its lower face 117 to receive the connector. The casing has lugs 108 that fit into the notches 106 on the connector, and that snap therein when the casing is pushed down around the connector, to fix the casing and connector together. The casing may incorporate a switch for detecting full insertion of a card. The casing itself may be constructed to form an entire card-receiving unit or may form only part of the unit, in conjunction with an addition card guide. FIG. 40 is a top isometric view of the casing alone, showing one of the lugs 108 and a downwardly-facing shoulder 112 of the casing that engages a rim surface of a connector body.

Figure 43:
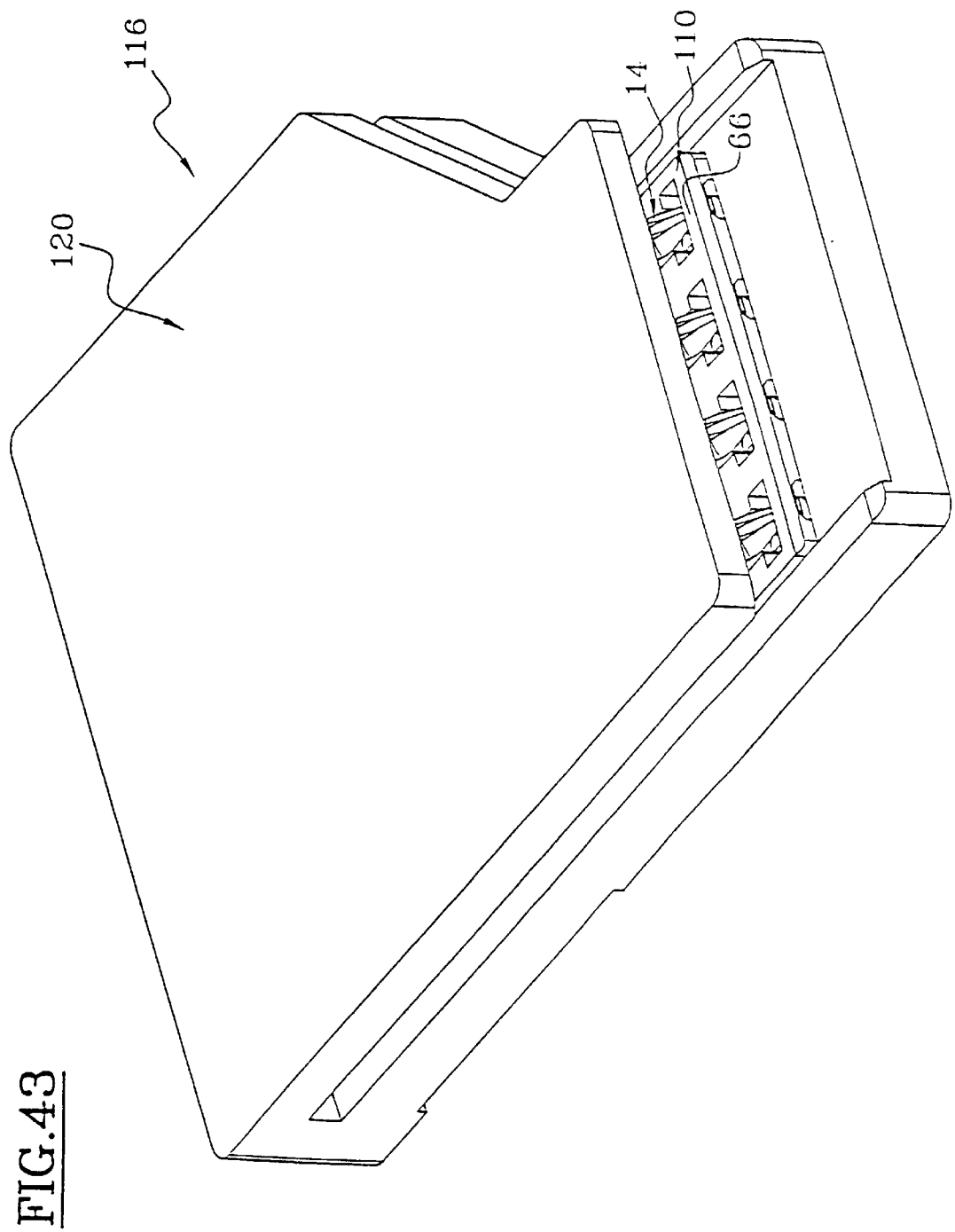
FIG. 43 is a top isometric view of a connector and casing assembly which includes an integrated switch.
Figure 44:
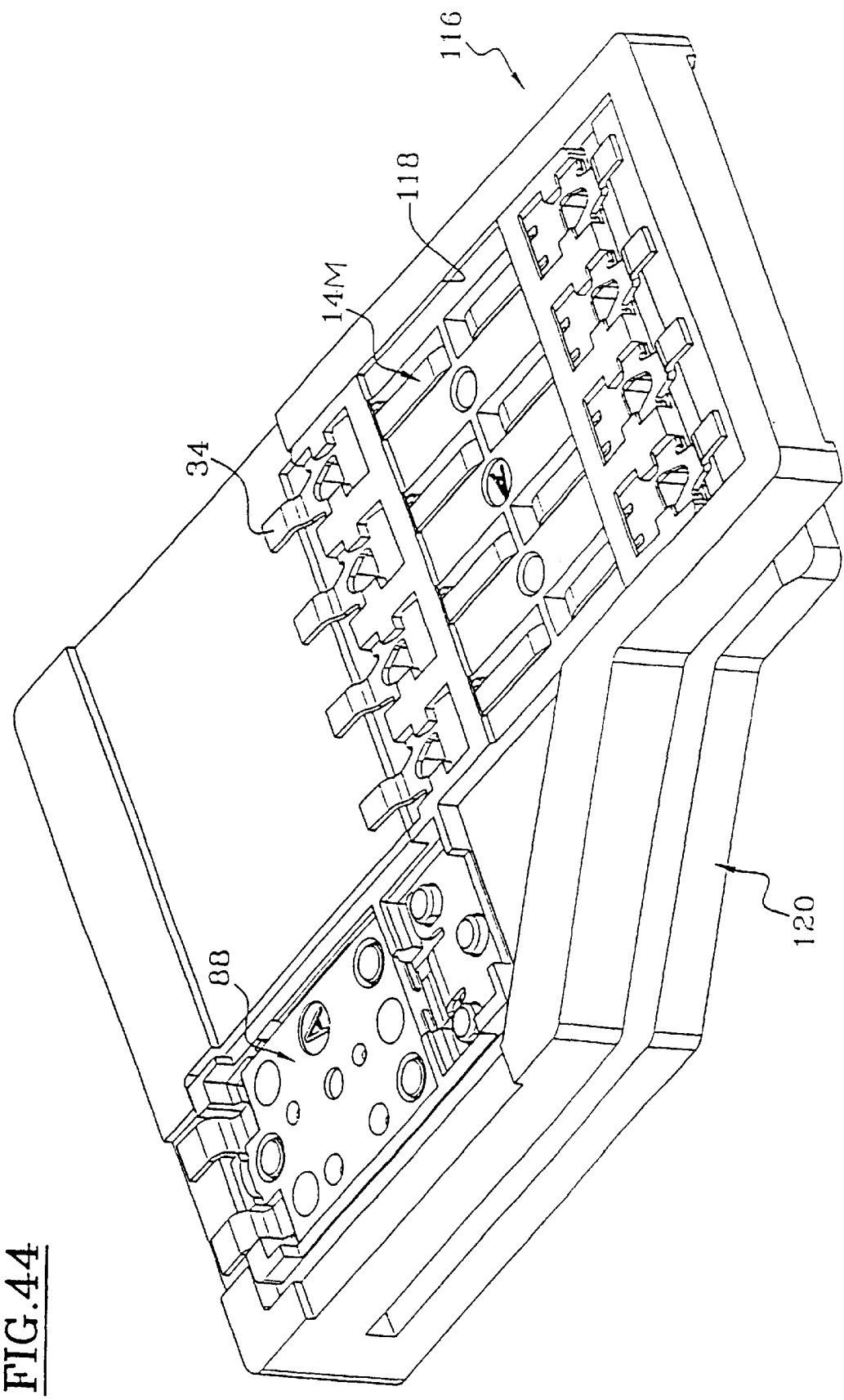
FIG. 44 is a bottom isometric view of the assembly of FIG. 43.
Figure 45:
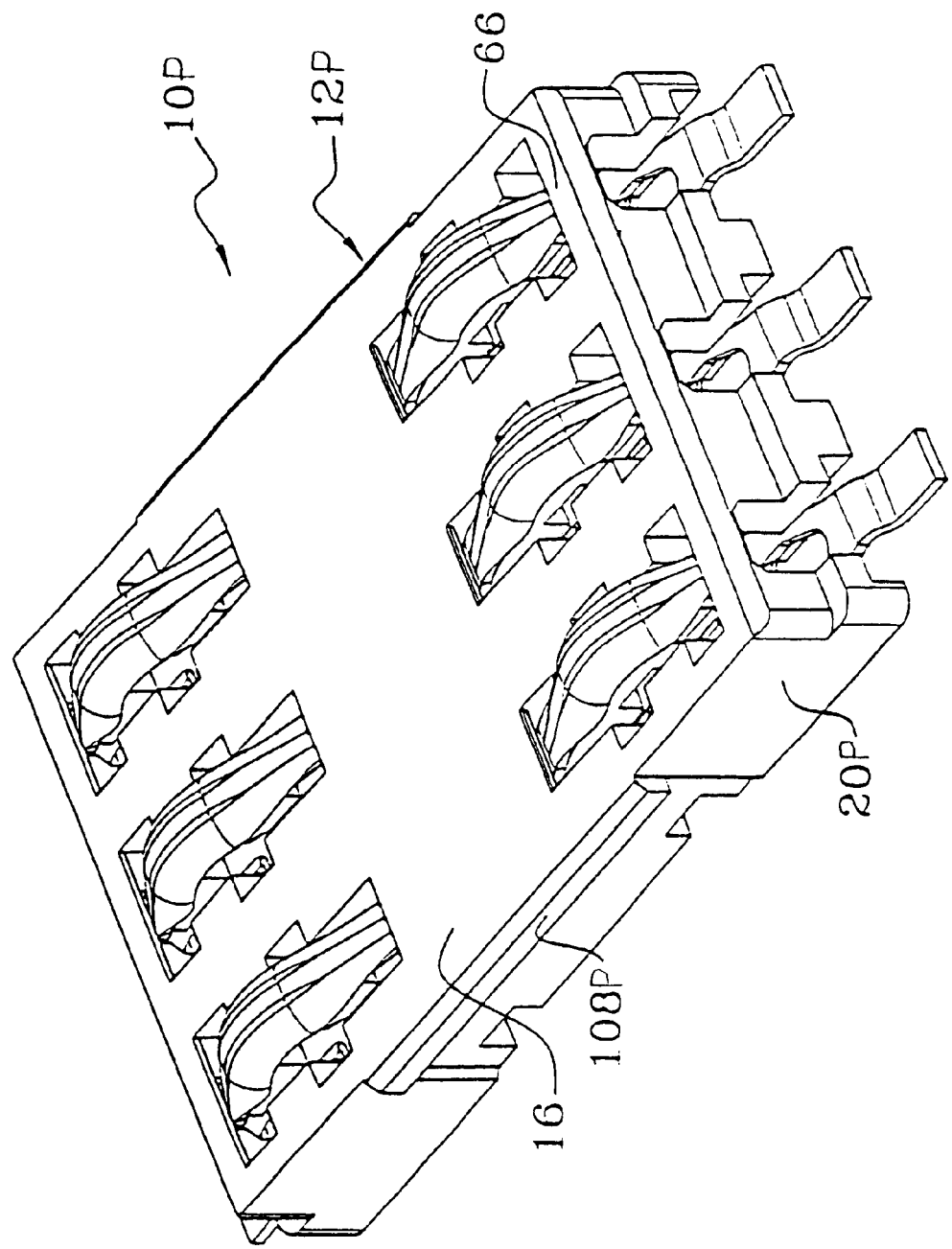
FIG. 45 is a top isometric view of a connector of another embodiment of the invention, with another retention means for fitting the connector into a casing.
Figure 46:
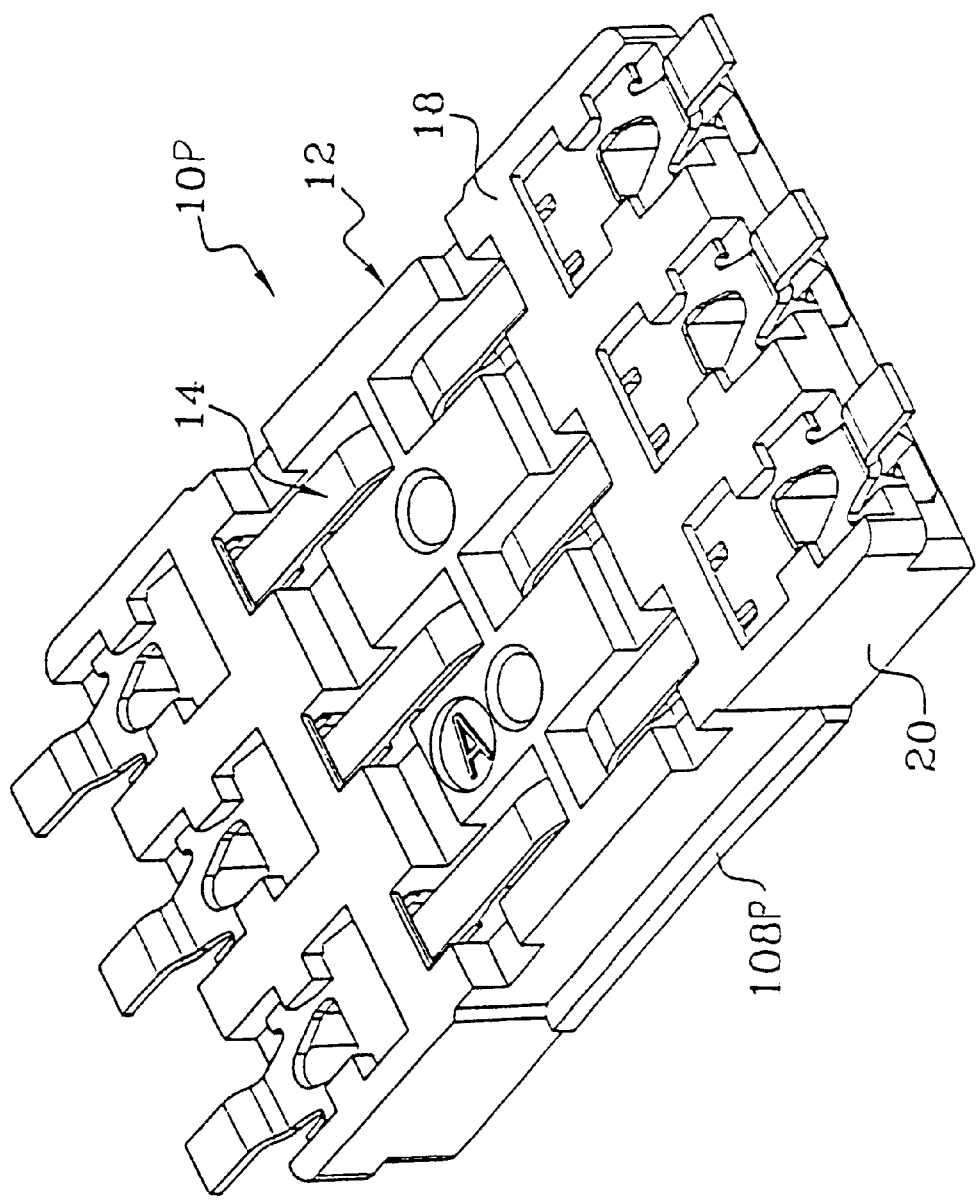
FIG. 46 is a bottom isometric of the connector of FIG. 45.
Figure 47:
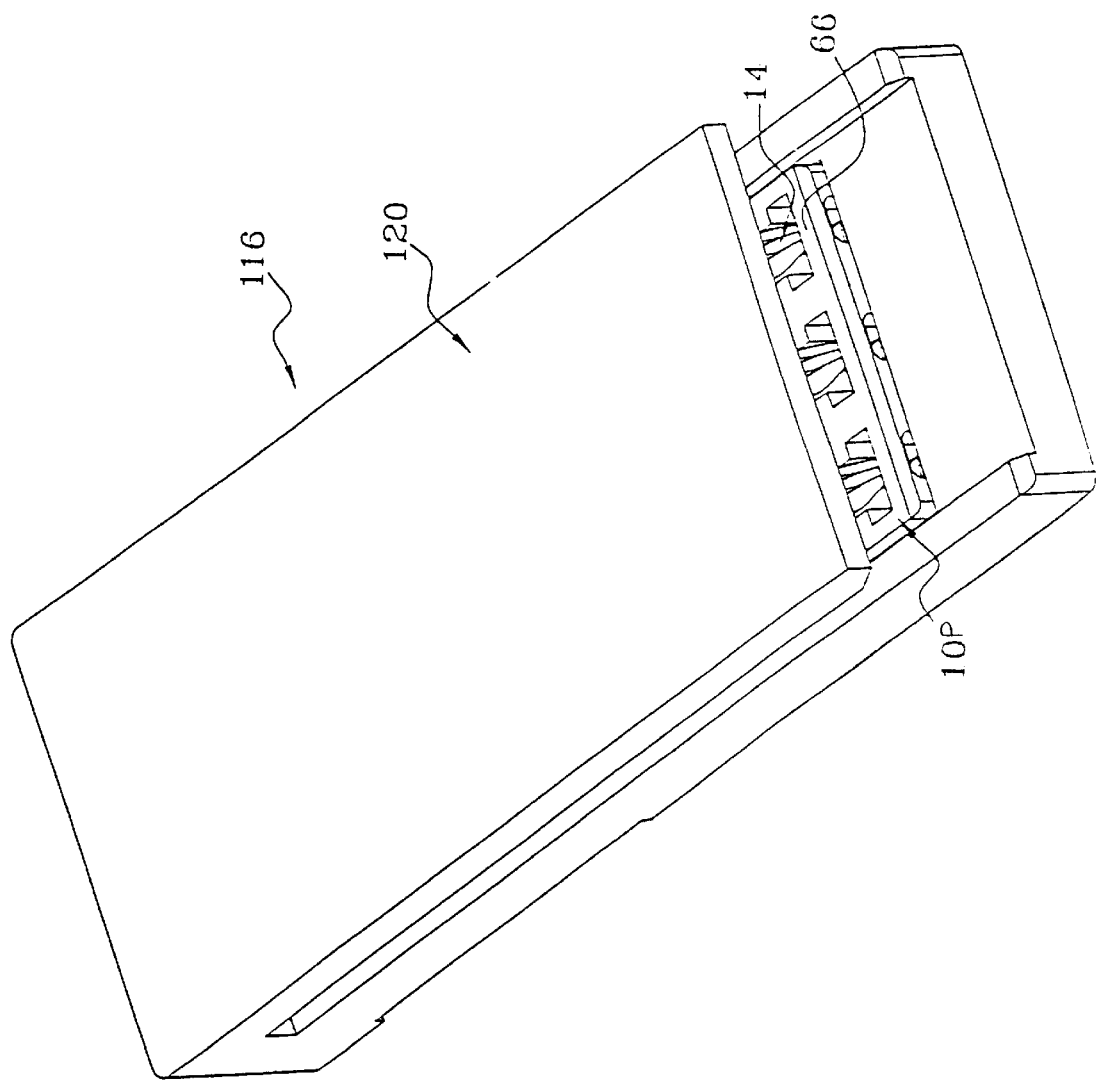
FIG. 47 is a top isometric view of the connector of FIG. 45 and of a casing fitted to it.
Figure 48:
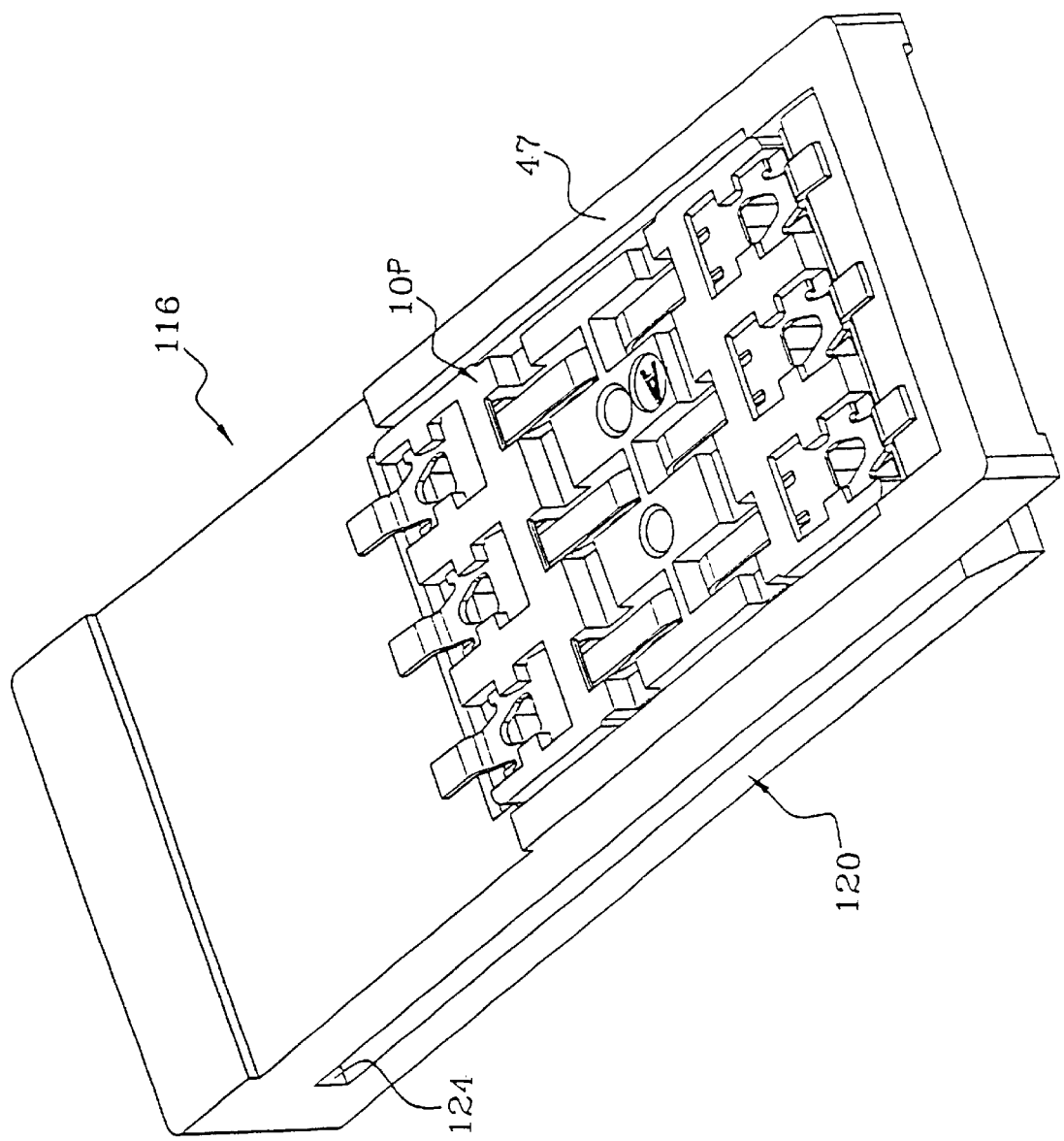
FIG. 48 is a bottom isometric view of the assembly of FIG. 47.

FIGS. 43–44 show a combination connector and casing, where the connector has a switch 88M with switch terminals in addition to the connector contacts 14M.

Figure 49:
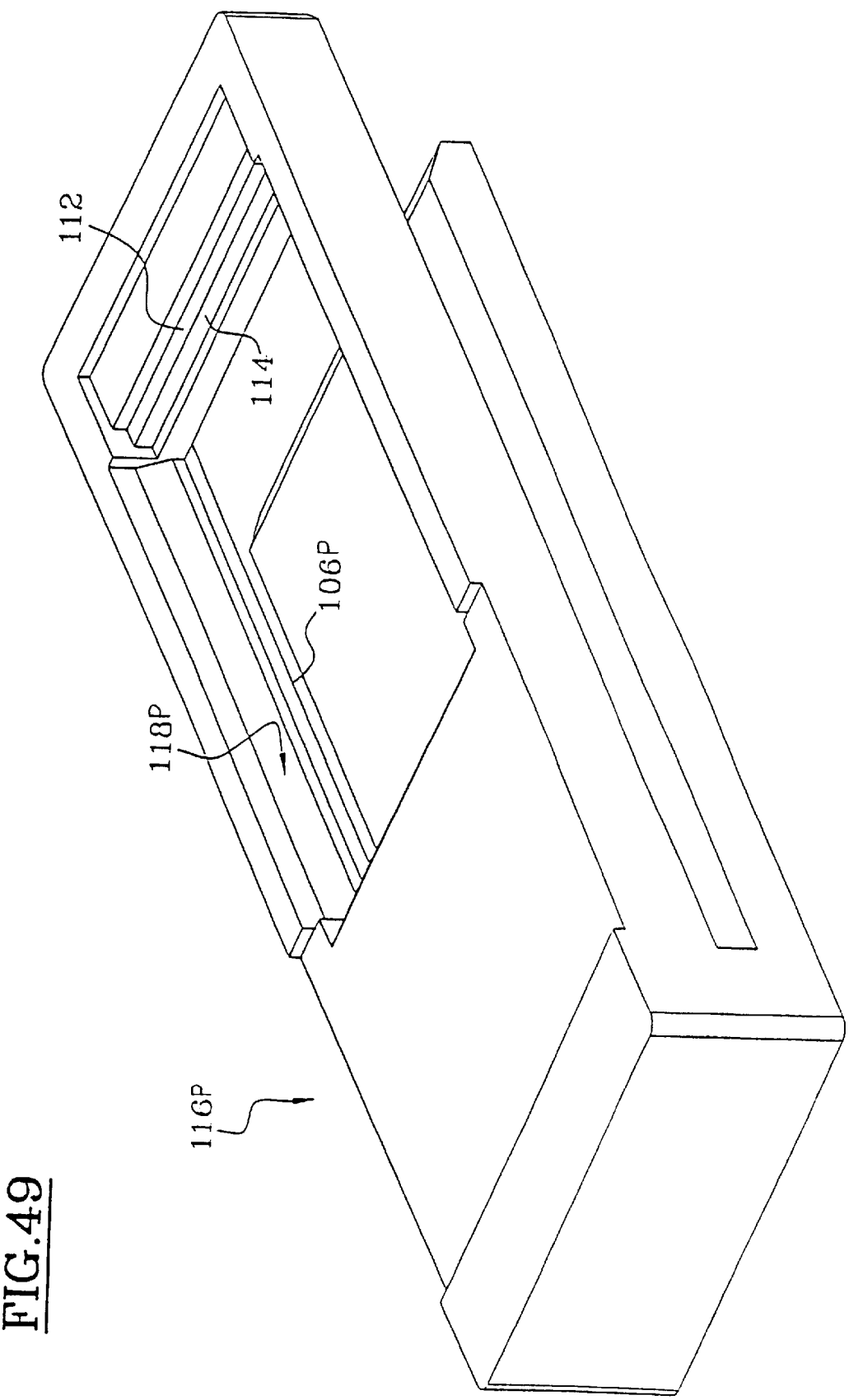
FIG. 49 is another top isometric view of the connector of FIG. 47.
Figure 50:
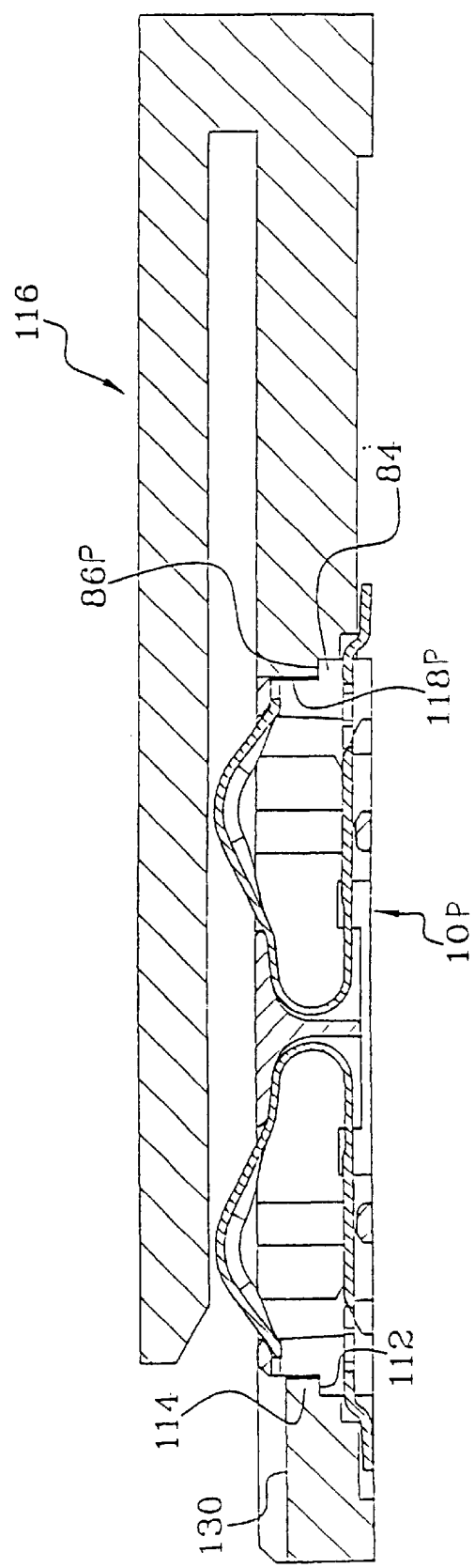
FIG. 50 is a sectional side view of the assembly of FIG. 47.
Figure 51:
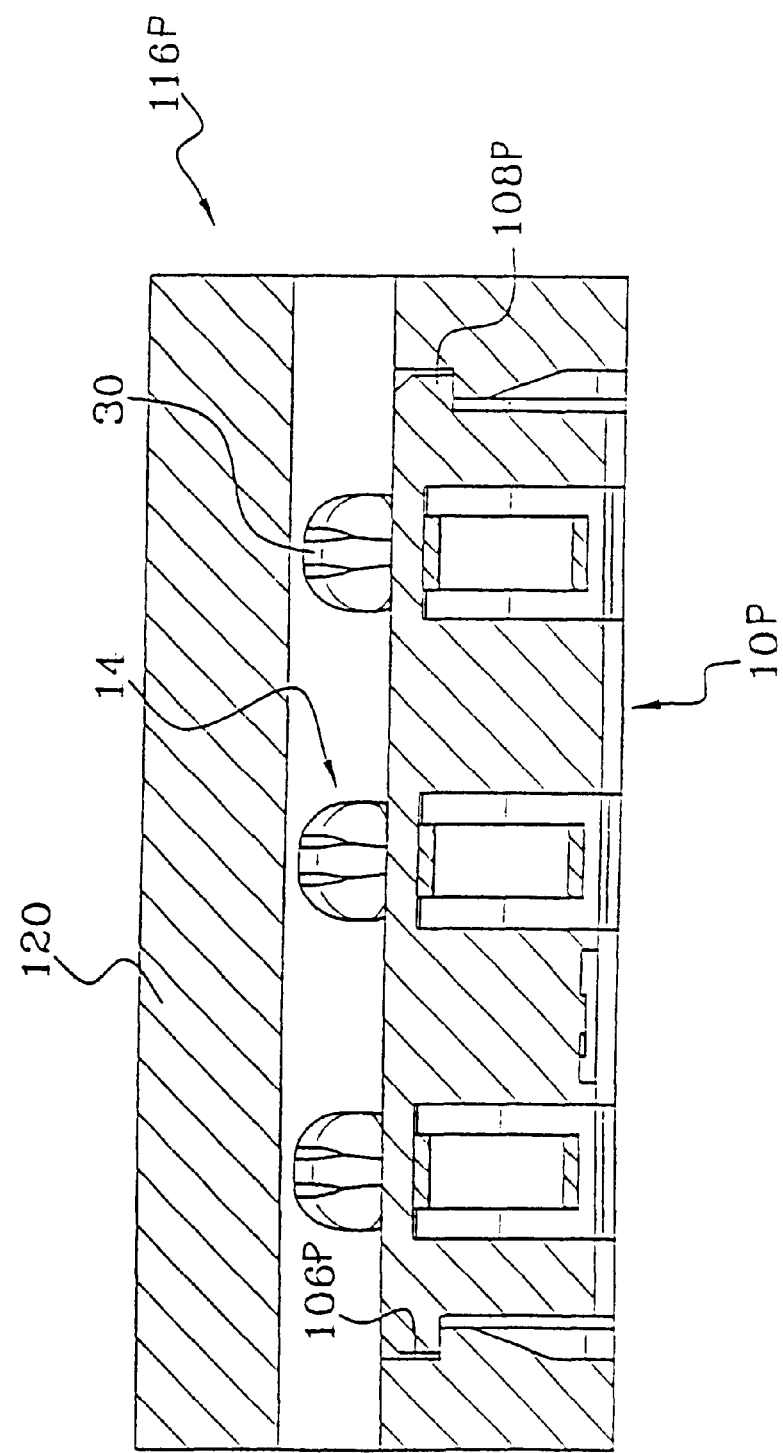
FIG. 51 is a sectional view of the assembly of FIG. 47.
Figure 52:
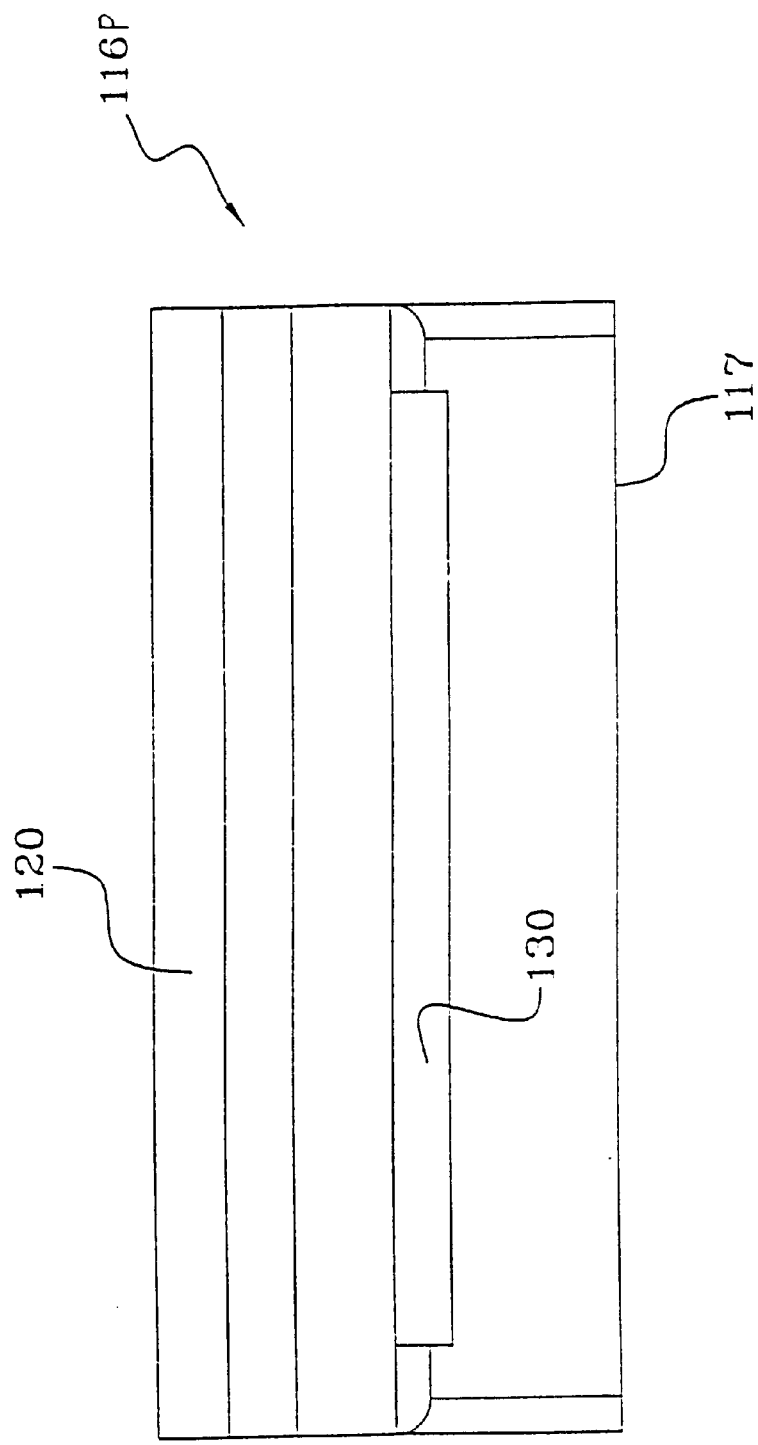
FIG. 52 is an end view of the assembly of FIG. 47.

FIGS. 45–52 illustrate a connector 10P with lugs 108P formed on the connector body 12P, with the lugs protruding from opposite lateral faces 20P of the body. As shown in FIG. 49, notches or indentations 106P are formed in recess 118P of a casing 116P. FIG. 51 shows that the connector 10P is held in the casing recess by engagement of the lugs 108P on the connector 10P with notches 106P on the casing. It is noted that a flat recess 130 (FIG. 52) is provided in the casing to facilitate molding.

Although applicant has used terms such as "top", "bottom", "horizontal" to help describe the invention as it is illustrated, it should be understood that the invention can be used in any orientation with respect to the Earth.

Thus, the invention provides a smart card connector which includes a one piece molded body and contacts that are inserted into the body after it has been molded. The body has longitudinally opposite ends and has contact-receiving cavities with rear open ends that extend by a majority of the height of the body, and with the cavity having an open rear end whose top is bridged by a top crosspiece. Each contact is of the type that has a central linking branch extending in about a 180° loop, with an upper end connected to the front of an upper branch and a lower end connected to a front of a lower branch of the contact. The upper branch has an upwardly-bowed contacting part that merges with a nose at the rear of the upper branch. The nose lies against the top rear crosspiece. The lower branch has foots on laterally opposite sides that can slide forwardly into grooves at opposite sides of the bottom of the cavity. As the foots each lies in a horizontal plane and slides forwardly into the cavity, the top branch of the contact is bent downwardly, primarily by bending of the looped central linking branch, so the contacting part can pass under the crosspiece at the top rear of the cavity. The lower branch can have a hole or downwardly-recessed termination tab under the nose to permit further downwardly flexion of the nose during installation.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A smart card connector for use with a card guide that guides a smart card to a final position, wherein the smart card has upper and lower faces and a plurality of contact pads on one of said faces and where the connector can establish electrical connection with the contact pads, comprising:

a one-piece molded insulative polymer body of largely parallelepiped shape, said body having a plurality of contact-holding cavities, having upper and lower body faces, having laterally opposite body sides, and having longitudinally opposite body ends;

a plurality of contacts each mounted in one of said cavities and having an upper branch with a contacting part projecting above said upper body face and a nose that lies rearward of said contacting part and which lies a distance under said upper body face, a central linking branch forming a largely 180° loop with an upper side merging with a front end of said upper section and a lower side, and a lower branch extending rearwardly from said lower side of said central linking branch;

a first of said cavities has a first cavity end that is open at a first of said body ends, with said first cavity end extending along a majority of the height of said first body end but with said body having a top crosspiece at the top of said cavity end, said crosspiece extending continuously across said cavity and the nose of a first of said contacts has a width no greater than the rest of said upper branch and said nose is biased upwardly against said top crosspiece.

2. The connector described in claim 1 wherein:

said first cavity has a horizontal groove at at least one lateral side of said first cavity, at a lower end of the cavity, with said groove having an open rear end;

the lower section of said first contact has a longitudinally-extending foot lying in said groove and in a horizontal plane;

said contacting part is downwardly deflectable sufficiently to pass under said top crosspiece while said foot lies in said horizontal plane and is slid horizontally into said groove.

3. The connector described in claim 1 wherein:

said top crosspiece has a front part that forms part of said upper body face, and said top crosspiece has a rear part that is beveled at a rearward-downward incline.

4. The connector described in claim 1 wherein:

said body has horizontally-spaced opposite parts forming notches with upwardly-facing surfaces; and including a casing with upper and lower casing walls forming a horizontal slot between them into which said smart card can be inserted, with said lower casing wall having an opening which can receive said body and having lugs for snapping under said notches.

5. The connector described in claim 1 wherein:

said contacts are arranged in at least two laterally-extending rows, with a predetermined center-to-center spacing P of contacts along each row;

said body has a side surface which is spaced by a distance P/2 from an adjacent contact in each of said rows, whereby to enable a plurality of connectors to be laid side-by-side to increase the number of contacts in each row.

6. A smart card connector for use with a card guide that guides a smart card to a final position, wherein the smart card has upper and lower faces and a plurality of contact pads on one of said faces and where the connector can establish electrical connection with the contact pads, comprising:

a one-piece molded insulative polymer body of largely parallelepiped shape, said body having a plurality of contact-holding cavities, having upper and lower body faces, having laterally opposite body sides, and having longitudinally opposite body ends;

a plurality of contacts each mounted in one of said cavities and having an upper branch with a contacting part projecting above said upper body face and a nose that lies rearward of said contacting part and which lies a distance under said upper body face, a central linking branch forming a largely 180° loop with an upper side merging with a front end of said upper section and a lower side, and a lower branch extending rearwardly from said lower side of said central linking branch;

a first of said cavities has a first cavity end that is open at a first of said body ends, with said first cavity end extending along a majority of the height of said first body end but with said body having a top crosspiece at the top of said cavity end and with the nose of a first of said contacts biased upwardly against said top crosspiece;

each of said cavities has a lower end that is open along the entire longitudinal length of the cavity except for a bottom crosspiece (74) that lies about halfway between longitudinally opposite ends of the cavity, with said bottom crosspiece extending laterally across the bottom of the cavity.

7. A smart card connector for use with a card guide that guides a smart card to a final position, wherein the smart card has upper and lower faces and a plurality of contact pads on one of said faces and where the connector can establish electrical connection with the contact pads, comprising:

a one-piece molded insulative polymer body of largely parallelepiped shape, said body having a plurality of contact-holding cavities, having upper and lower body faces, having laterally opposite body sides, and having longitudinally opposite body ends;

a plurality of contacts each mounted in one of said cavities and having an upper branch with a contacting part projecting above said upper body face and a nose that lies rearward of said contacting part and which lies a distance under said upper body face, a central linking branch forming a largely 180° loop with an upper side merging with a front end of said upper section and a lower side, and a lower branch extending rearwardly from said lower side of said central linking branch;

a first of said cavities has a first cavity end that is open at a first of said body ends, with said first cavity end extending along a majority of the height of said first body end but with said body having a top crosspiece at the top of said cavity end and with the nose of a first of said contacts biased upwardly against said top crosspiece;

the first section of each of said contacts has a hole lying under said nose, with said hole being large enough to receive said nose when said nose is pushed down during forward insertion of said contact into said cavity.

8. A connector for engaging contact pads of a smart card comprising:

an insulative body which is molded of insulative material and which has a largely parallelopiped shape with upper and lower body faces, laterally opposite body sides, and longitudinally opposite body ends, said upper body face extending horizontally said body having at least one contact-holding cavity extending from a first of said body ends and in a forward longitudinal direction therefrom, said body having a slot in said upper body face that extends downward into said cavity, and said body forming a longitudinally extending groove at one lateral side of the bottom of said cavity;

a sheet metal contact with an upper branch having an upwardly bowed contacting part and a nose at a rear end of the upper branch, a linking branch extending in a largely 180° loop with an upper side merging with a front end of said second branch and with a lower side, and a lower branch extending rearwardly from said lower side of said linking branch with said lower branch having a widened portion, with said widened portion including a lateral extension forming a foot for fitting in said longitudinally extending groove;

said lower branch extending horizontally and rearwardly from said lower side of said linking branch to a location under said nose and limiting downward deflection of said nose during installation;

said contact is insertable into said cavity from said first body end, with said connecting section of said upper branch being deflectable downwardly toward said lower branch to reduce the height of said contact sufficiently to pass under said top crosspiece while said lower branch with said foot extends horizontally and said foot passes into said groove, until said upwardly bowed contacting part moves upward through said slot and said nose moves upwardly against said top crosspiece;

said lower branch has a recess lying under said nose to receive said nose during insertion of said contact into said cavity.

9. The connector described in claim 8 wherein:

said upper branch has a maximum width forward of said nose and said nose has a width no greater than said maximum width of upper branch, said body includes a top crosspiece extending horizontally across the top of a rear end of said cavity, and said nose lies against said top crosspiece.

\* \* \* \* \*